United States Patent
Park et al.

(10) Patent No.: US 10,691,327 B2
(45) Date of Patent: Jun. 23, 2020

(54) MOBILE TERMINAL AND CONTROL METHOD FOR THE MOBILE TERMINAL

(71) Applicant: LG ELECTRONICS INC., Seoul (KR)

(72) Inventors: Sangjoo Park, Seoul (KR); Insu Jun, Seoul (KR); Daeho Moon, Seoul (KR); Jaeyong Won, Seoul (KR); Jongho Kim, Seoul (KR); Sihwan Oh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 518 days.

(21) Appl. No.: 15/140,297

(22) Filed: Apr. 27, 2016

(65) Prior Publication Data

US 2017/0075538 A1  Mar. 16, 2017

(30) Foreign Application Priority Data

Sep. 15, 2015 (KR) .................. 10-2015-0130559

(51) Int. Cl.
| | |
|---|---|
| *G06F 3/0488* | (2013.01) |
| *G06F 3/0485* | (2013.01) |
| *G06F 3/0482* | (2013.01) |
| *H04L 29/08* | (2006.01) |
| *H04L 12/26* | (2006.01) |

(52) U.S. Cl.
CPC .......... *G06F 3/0488* (2013.01); *G06F 3/0482* (2013.01); *G06F 3/0485* (2013.01); *G06F 3/04855* (2013.01); *G06F 3/04883* (2013.01); *H04L 43/16* (2013.01); *H04L 67/02* (2013.01)

(58) Field of Classification Search
None
See application file for complete search history.

(56) References Cited

U.S. PATENT DOCUMENTS

| | | |
|---|---|---|
| 5,532,715 A | 7/1996 | Bates et al. |
| 2002/0093496 A1 | 7/2002 | Gould |
| (Continued) | | |

OTHER PUBLICATIONS

European Patent Office Application Serial No. 16184023.6, Search Report dated Jan. 23, 2017, 9 pages.

(Continued)

*Primary Examiner* — Abdullah Al Kawsar
*Assistant Examiner* — David V Luu
(74) *Attorney, Agent, or Firm* — Lee Hong Degerman Kang & Waimey

(57) ABSTRACT

The present disclosure relates to a mobile terminal capable of moving screen information displayed on a touch screen based on a touch input and a control method thereof. A mobile terminal according to the present disclosure may include a touch screen configured to display screen information, and a controller configured to perform a different function for screen information displayed on the touch screen according to whether or not a touch applied in one direction on the touch screen satisfies a predetermined condition, and the controller may perform at least one add function associated with screen information displayed on the touch screen when the touch satisfies the predetermined condition, and scroll screen information displayed on the touch screen when the touch does not satisfies the predetermined condition.

12 Claims, 31 Drawing Sheets

(56) References Cited

U.S. PATENT DOCUMENTS

| | | | | |
|---|---|---|---|---|
| 2007/0233692 A1* | 10/2007 | Lisa | .................. | G06F 17/30651 |
| 2009/0073194 A1* | 3/2009 | Ording | .................. | G06F 3/0485 |
| | | | | 345/672 |
| 2011/0083111 A1* | 4/2011 | Forutanpour | ........... | H04W 4/21 |
| | | | | 715/863 |
| 2012/0124472 A1* | 5/2012 | Pine | ........................ | G06F 3/038 |
| | | | | 715/707 |
| 2012/0317503 A1* | 12/2012 | Noh | .................... | G06F 3/04883 |
| | | | | 715/760 |
| 2014/0101609 A1* | 4/2014 | Bamford | ............... | G06F 3/0484 |
| | | | | 715/810 |
| 2014/0152589 A1* | 6/2014 | Komoda | ............. | G06F 3/04883 |
| | | | | 345/173 |
| 2015/0143273 A1 | 5/2015 | Bernstein et al. | | |
| 2015/0205494 A1* | 7/2015 | Scott | .................. | G06F 3/04845 |
| | | | | 345/158 |
| 2015/0206321 A1* | 7/2015 | Scavezze | .................. | G06T 7/20 |
| | | | | 345/633 |
| 2016/0070463 A1* | 3/2016 | Lobo | .................... | G06F 3/0485 |
| | | | | 345/173 |
| 2016/0117147 A1* | 4/2016 | Zambetti | ............... | G06F 3/0236 |
| | | | | 715/727 |

OTHER PUBLICATIONS

State Intellectual Property Office of the People's Republic of China Application Serial No. 201610825910.2, Office Action dated Jun. 5, 2019, 8 pages.

* cited by examiner

MOBILE TERMINAL AND CONTROL METHOD FOR THE MOBILE TERMINAL

CROSS-REFERENCE TO RELATED APPLICATION

Pursuant to 35 U.S.C. § 119(a), this application claims the benefit of earlier filing date and right of priority to Korean Application No. 10-2015-0130559, filed on Sep. 15, 2015, the contents of which is incorporated by reference herein in its entirety.

BACKGROUND OF THE INVENTION

1. Field of the Invention

The present disclosure relates to a mobile terminal capable of moving screen information displayed on a touch screen based on a touch input and a control method thereof.

2. Description of the Related Art

Terminals may be divided into mobile/portable terminals and stationary terminals according to their mobility. Also, the mobile terminals may be classified into handheld terminals and vehicle mount terminals according to whether or not a user can directly carry.

As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

In such a terminal, in order to enhance user convenience, different functions may be allocated to various types of touch inputs, respectively, to execute the allocated functions according to the types of a touch input applied thereto. For example, a scroll function for moving currently displayed screen information may be carried out in response to a drag touch or flick touch in the terminal. Such a scroll function may be easily used to display not-yet-displayed information instead of currently displayed screen information. Meanwhile, in order to further enhance user convenience, an improvement such as allocating an additional function to a touch input having a pre-allocated function may be taken into consideration.

SUMMARY OF THE INVENTION

An aspect of the present disclosure is to provide a mobile terminal capable of enhancing user convenience through a smarter scroll function, and a control method thereof.

Moreover, another aspect of the present disclosure is to provide a mobile terminal capable of allocating an additional function to a predetermined touch input for a scroll function to allow a user to easily access an additional function, and a control method thereof.

Moreover, still another aspect of the present disclosure is to provide a mobile terminal capable of providing intuitive information on screen information being displayed on the mobile terminal, and a control method thereof.

A mobile terminal according to an embodiment of the present disclosure may include a touch screen configured to display screen information, and a controller configured to perform a scroll function of moving screen information displayed on the touch screen in any one direction based on a first touch applied in a first direction on the touch screen, wherein the controller scrolls the screen information in another direction opposite to the one direction based on a second touch applied in a second direction opposite to the first direction, and performs a different function according to a touch speed of the second touch.

According to an embodiment, the controller may perform a first add function linked to screen information displayed on the touch screen when the touch speed of the second touch is above a predetermined speed, and perform a second add function linked to screen information displayed on the touch screen when the touch speed of the second touch is below a predetermined speed.

According to an embodiment, screen information displayed on the touch screen may be at least one portion of a specific webpage, and the first add function may be a function of copying a uniform resource locator (URL) address of the specific webpage.

According to an embodiment, the second add function may include at least one of the capture function and search function.

According to an embodiment, screen information displayed on the touch screen may be at least part of a specific electronic document, and the controller may count a display maintaining time of the screen information displayed on the touch screen, and generate log information for screen information in which the display maintaining time satisfies a preset criteria among screen information that have been displayed on the touch screen.

The counting may be carried out when a touch speed in the second direction is above a predetermined speed.

According to an embodiment, a scroll bar for changing a display range of the specific electronic document may be displayed on the touch screen, and the scroll bar may display a first indicator indicating a position containing currently displayed screen information on the specific electronic document and a second indicator indicating a position containing the screen information of a portion from which the log information is generated on the specific electronic document.

According to an embodiment, the controller may switch currently displayed screen information on the touch screen to screen information at a portion from which the log information is generated in response to the second indicator being selected.

According to an embodiment, the controller may display a guide image indicating that the first or the second add function can be carried out in one region of the touch screen in response to a touch in the second direction.

According to an embodiment, the guide image may disappear from the touch screen when the execution of the first or the second add function is completed.

According to an embodiment, screen information displayed on the touch screen may be at least part of a specific electronic document, and the controller may display graphic objects corresponding to the first and the second add function, respectively, in response to a touch in the second direction, and process a function corresponding to the selected graphic object in connection with the electronic document when either one of the graphic objects is selected.

According to an embodiment, either one of the first and the second add function may be a share function of sharing the specific electronic document, and the controller may transmit a file corresponding to the specific electronic document or a URL address of the electronic document to at least one pre-specified external device when the share function is selected between the graphic objects.

According to an embodiment, either one of the first and the second add function may include a keyword display function, and the controller may display at least one keyword contained in screen information displayed on the touch screen in one region of the touch screen in response to a touch applied in the second direction.

According to an embodiment, when any one of keywords displayed in the one region is selected, the controller may display a list for selecting a function that is executable in connection with the selected keyword, and when any one items is selected from the list, the controller may process a function corresponding to the selected item using the selected keyword.

According to an embodiment, a function that is executable in connection with the selected keyword may include a search function, and when an item corresponding to the search function is selected, the controller may search information associated with the selected keyword using a predetermined search engine to display information corresponding to a search result for the selected keyword in at least one region on the touch screen.

According to an embodiment, screen information displayed on the touch screen may be at least part of information having a predetermined portion, and a scroll bar for changing a display range of information displayed on the touch screen may be displayed in one region of the touch screen, and the scroll bar may further include a first indicator indicating a position containing a current displayed screen information on information having the predetermined portion and an indicator indicating a position containing screen information that has been displayed on the touch screen when a touch satisfying the predetermined condition is applied thereto.

A mobile terminal according to the present disclosure may include a touch screen configured to display screen information, and a controller configured to perform a different function for screen information displayed on the touch screen according to whether or not a touch applied in one direction on the touch screen satisfies a predetermined condition, and the controller may perform at least one add function associated with screen information displayed on the touch screen when the touch satisfies the predetermined condition, and scroll screen information displayed on the touch screen when the touch does not satisfies the predetermined condition.

According to an embodiment, a touch satisfying the predetermined condition may be a drag or flick touch applied at a speed above a predetermined speed.

According to an embodiment, a touch satisfying the predetermined condition may be a drag or flick touch applied in a touch direction opposite to a touch direction that has been applied on the touch screen just prior to applying the touch input.

A mobile terminal according to the present disclosure may include a touch screen configured to display screen information, and a controller configured to move the screen information on the touch screen to sequentially display output object information according to a touch direction of a predetermined type of touch applied to the touch screen, wherein the controller activates a specific mode associated with the execution of an add function linked to screen information displayed on the touch screen when the predetermined type of touch is additionally applied according to the touch direction in a state that screen information corresponding to the last portion of the output object information is displayed on the touch screen.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that, although the terms first, second, etc. may be used herein to describe various elements, these elements should not be limited by these terms. These terms are only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context.

Terms 'include' or 'has' used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as a digital TV, a desktop computer, a digital signage and the like, excluding a case of being applicable only to the mobile terminals.

Figure 1A:
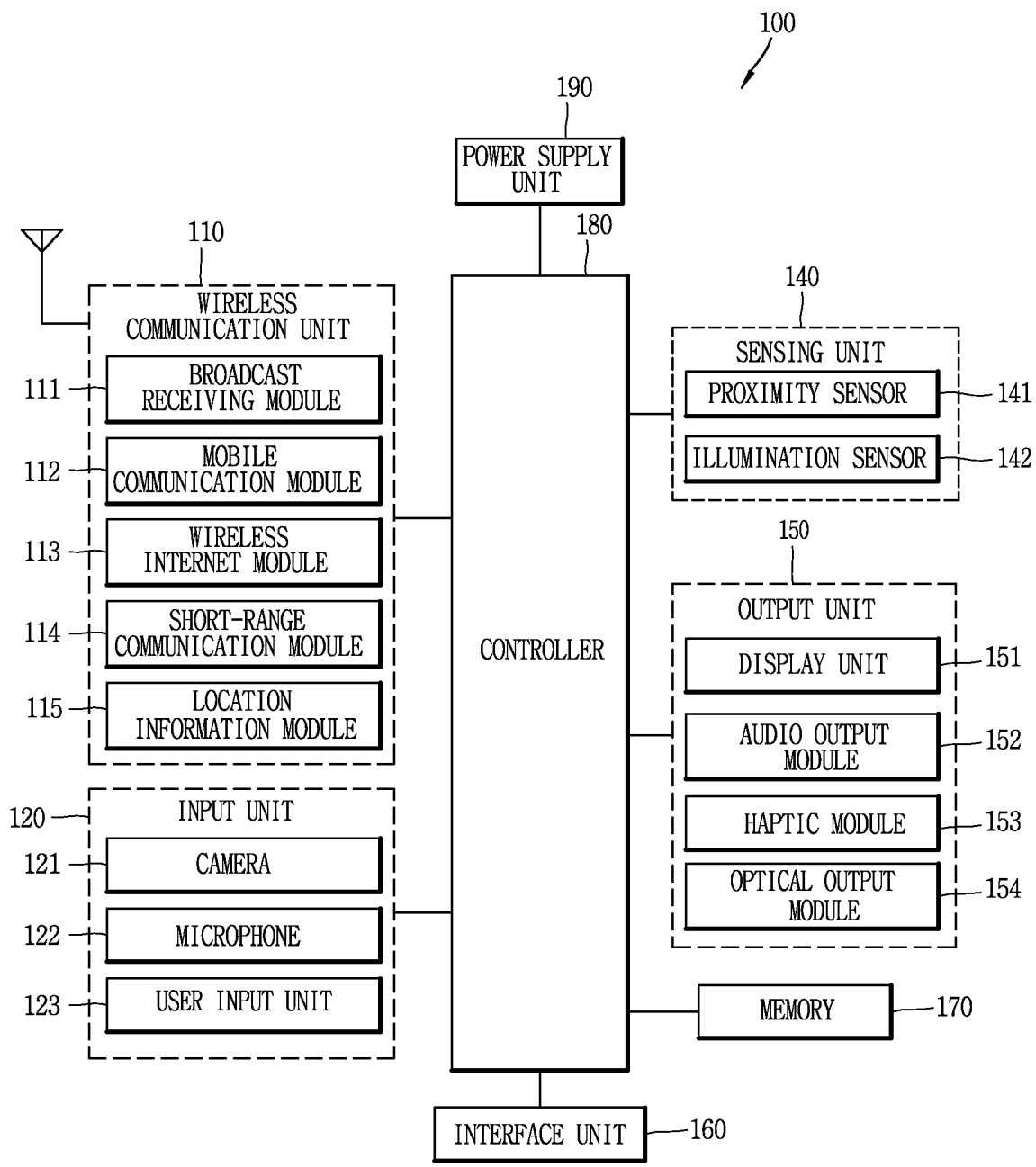
FIG. 1A is a block diagram for explaining a mobile terminal associated with the present disclosure.
Figure 1B:
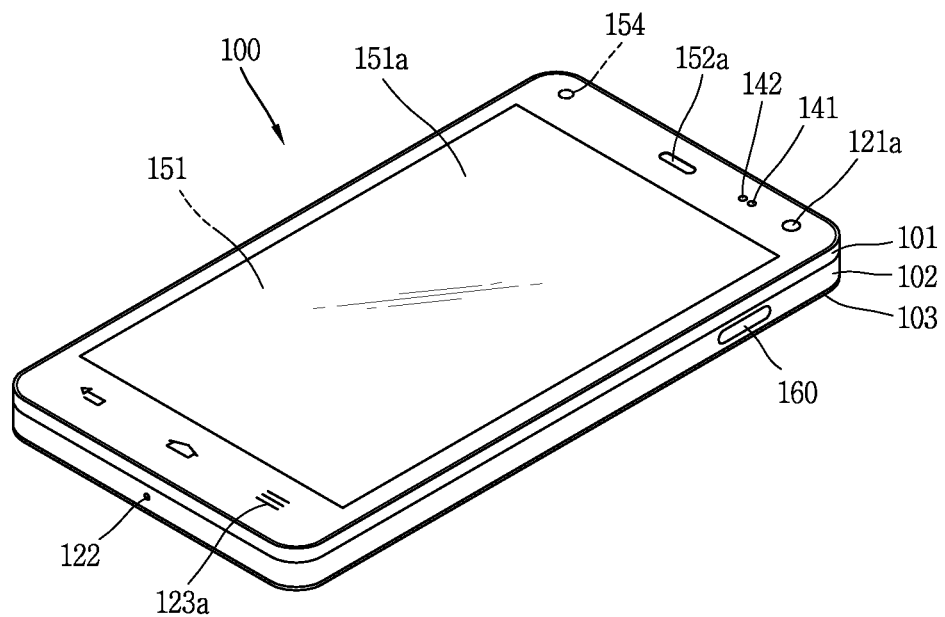
FIGS. 1B and 1C are conceptual views in which an example of a mobile terminal associated with the present disclosure is seen from different directions.
Figure 1C:
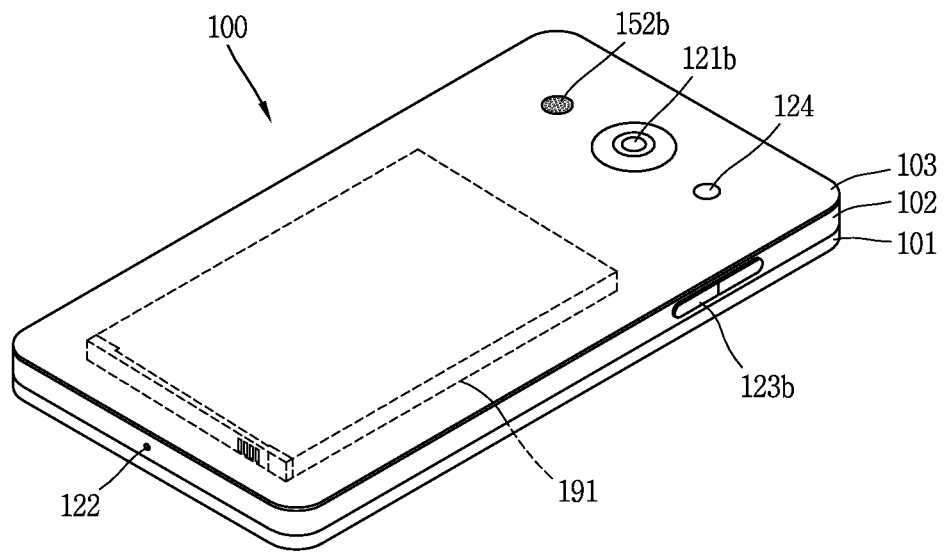

Referring to FIGS. 1A through 1C, FIG. 1A is a block diagram of a mobile terminal in accordance with the present disclosure, FIGS. 1B and 1C are conceptual views of one example of the mobile terminal, viewed from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1 illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

In a mobile terminal according to the present disclosure, the camera 121 may include a 3-dimensional (3D) camera or depth camera. According to the present disclosure, it may be configured to sense a user's human body located on an arbitrary space (or predetermined space) in which a hologram image (or hologram object) is displayed through an image sensor provided in the 3D camera (depth camera). The image sensor may be configured to sense a user gesture on the arbitrary space as well as sense the user's human body. In a mobile terminal according to the present disclosure, it may be possible to acquire a stereoscopic (or 3D) image corresponding to an object (or user's human body) approaching a hologram image through the 3D camera.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 may be configured to output an audio signal, a video signal or a tactile signal. The output unit 150 may include at least one of a display unit 151, an audio output module 152, a haptic module 153, and an optical output module 154, and a hologram display unit (or holography module) 155. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

Furthermore, the memory 170 may store data for supporting various functions of the mobile terminal 100. The memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

The controller 180 may control at least part of the components illustrated in FIG. 1A, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1, prior to explaining various exemplary embodiments implemented by the mobile terminal 100 having the configuration.

First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), Long Term Evolution-Advanced (LTE-A), etc.)

The wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), High Speed Uplink Packet Access (HSUPA), Long Term Evolution (LTE), Long Term Evolution-Advanced (LTE-A) and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (Wireless USB) and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, a smart glass or a head mounted display (HMD), which is able to exchange data with the mobile terminal 100 (or to cooperate with the mobile terminal 100). The short-range communication module 114 may sense (recognize) a wearable device, which is able to communicate with the mobile terminal), near the mobile terminal 100. In addition, when the sensed wearable device is a device which is authenticated to communicate with the mobile terminal 100 according to the present disclosure, the controller 180 may transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user may check the received message using the wearable device.

The location information module 115 denotes a module for detecting or calculating a position of the mobile terminal. An example of the location information module 115 may include a Global Position System (GPS) module or a Wireless Fidelity (Wi-Fi) module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. As needed, the location information module 115 may perform any function of another module of the wireless communication unit 110 to obtain data for the location of the mobile terminal in a substituted or additional manner. The location information module 115, as a module used to acquire the location (or current location) of the mobile terminal, may not be necessarily limited to a module for directly calculating or acquiring the location of the mobile terminal.

Next, the input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames may be displayed on the display unit 151. On the other hand, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). On the other hand, the microphone 122 may include assorted noise removing algorithms to remove noise generated in the course of receiving the external audio signal.

The user input unit 123 may receive information input by a user. When information is input through the user input unit 123, the controller 180 may control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. On the other hand, the virtual key or the visual key may be displayable on the touch screen in various shapes, for example, graphic, text, icon, video or a combination thereof.

The sensing unit 140 may sense at least one of internal information of the mobile terminal, surrounding environment information of the mobile terminal and user information, and generate a sensing signal corresponding to it. The controller 180 may control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this case, the touch screen (touch sensor) may be categorized into a proximity sensor.

Hereinafter, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). On the other hand, the controller 180 may process data (or information) corresponding to the proximity touches and the proximity touch patterns sensed by the proximity sensor 141, and output visual information corresponding to the process data on the touch screen. In addition, the controller 180 may control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like.

As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180 or the controller 180 itself.

On the other hand, the controller 180 may execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 may calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor (for example, CCD, CMOS, etc.) The camera sensor may include at least one of a photo sensor and a laser sensor.

The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may also be implemented as a stereoscopic display unit for displaying stereoscopic images.

The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 may generate various tactile effects the that user may feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like.

A signal output by the optical output module 154 may be implemented in such a manner that the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 may typically control the general operations of the mobile terminal 100. For example, the controller 180 may set or release a lock state for restricting a user from inputting a control command with respect to applications when a status of the mobile terminal meets a preset condition.

The controller 180 may also perform controlling and processing associated with voice calls, data communications, video calls, and the like, or perform pattern recognition processing to recognize a handwriting input or a picture drawing input performed on the touch screen as characters or images, respectively. In addition, the controller 180 may control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

The power supply unit 190 may include a connection port. The connection port may be configured as one example of the interface unit 160 to which an external (re)charger for supplying power to recharge the battery is electrically connected.

As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance.

On the other hand, various embodiments described herein may be implemented in a computer-readable or its similar medium using, for example, software, hardware, or any combination thereof.

Referring to FIGS. 1B and 1C, the mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner. The description to be associated with a specific type of mobile terminal or on a specific type of mobile terminal will be also typically applied to another type of mobile terminal.

Here, the terminal body may be understood as a conception which indicates the mobile terminal 100 as at least one assembly.

The mobile terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102.

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b.

The cases 101, 102, 103 may be formed by injection-molding synthetic resin or may be formed of a metal, for example, stainless steel (STS), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

Here, those components may not be limited to the arrangement, but be excluded or arranged on another surface if necessary. For example, the first manipulation unit 123a may not be disposed on the front surface of the terminal body, and the second audio output module 152b may be disposed on the side surface other than the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display (not shown) on a rear surface of the window 151a or patterned directly on the rear surface of the window 151a. Or, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 for supplying power to the mobile terminal 100 may be disposed on the terminal body. The power supply unit 190 may include a batter 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

As described above, a mobile terminal according to the present disclosure may include a touch screen 151, and various screen information that can be visually provided from the mobile terminal may be displayed on the touch screen 151. Moreover, a mobile terminal according to the present disclosure may perform various controls based on a touch using a touch object (for example, a finger, a stylus pen, a pointer, etc.) applied to the touch screen 151. For example, the mobile terminal allocates different functions to various types of touch inputs, respectively, and executes the allocated functions according to the types of the applied touch input.

For example, when a short touch is applied to any one icon in a state that a plurality of icons are displayed on the touch screen, the controller 180 may process the short touch as a control command for selecting an icon to which the short touch is applied among the plurality of icons.

For another example, when a pinch-in touch or pinch-out touch is applied in a state that an arbitrary image is displayed on the touch screen, the controller 180 may process the pinch-in touch or pinch-out touch as a control command for enlarging or reducing the displayed image.

Moreover, a mobile terminal according to the present disclosure may perform a scroll function for switching at least part of currently displayed screen information to another screen information in response to a drag touch, flick touch or slide touch.

In other words, upon receiving a touch to which a control command for the execution of a scroll function is allocated, the controller 180 may easily use it allow at least part of currently displayed information to disappear or move on the touch screen in order to display not-yet-displayed information instead of the currently displayed information.

On the other hand, in a mobile terminal according to the present disclosure, a control command for another function may be additionally defined for a touch to which the scroll function is allocated. The another function may denote screen information currently displayed on the touch screen, an electronic document containing such screen information, or an additional function for an application associated with the screen information.

In other words, when a touch input for a scroll function satisfies a predetermined condition, the present disclosure may determine it as a user's intention desired to perform an additional function, and provide a function corresponding thereto.

As described above, according to the present disclosure, it may be possible to enhance user convenience through a smarter scroll function, and allocate an additional function to a predetermined type of touch input for a scroll function, thereby allowing the user to access such an additional function.

Figure 2:
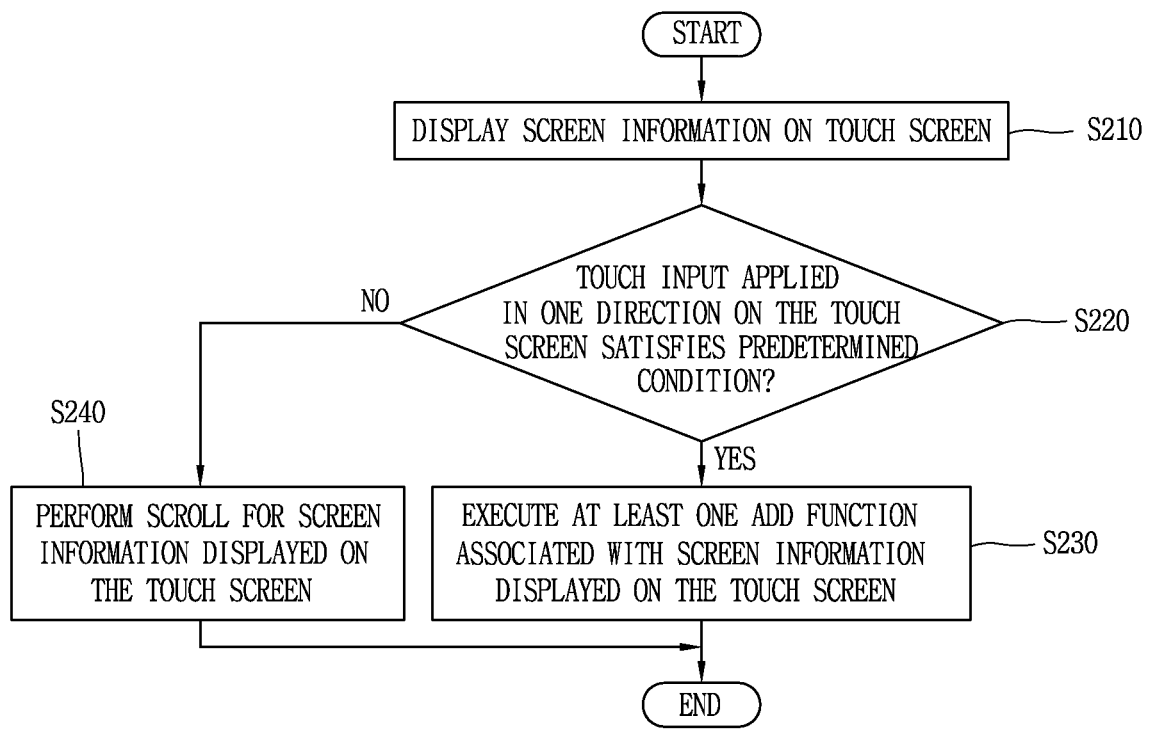
FIG. 2 is a flow chart for explaining a control method associated with the present disclosure.
Figure 3A:
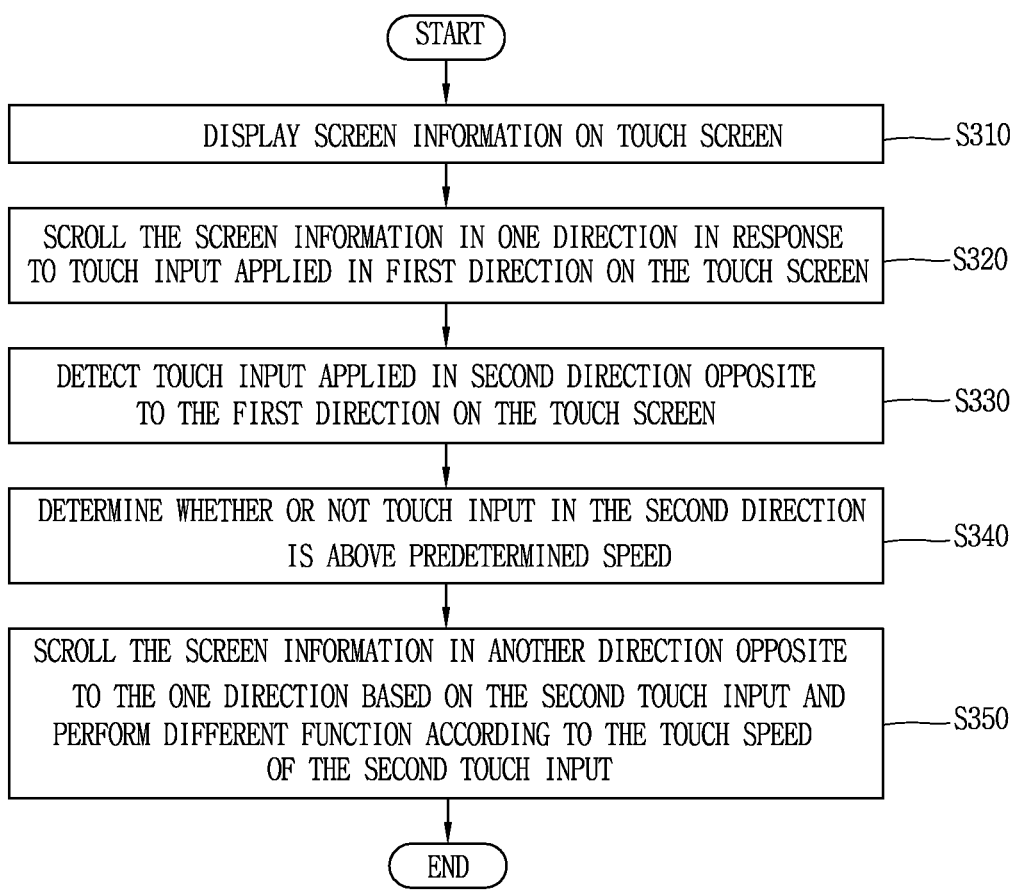
FIGS. 3A, 3B and 4 are conceptual views for explaining a control method associated with a scroll function according to the present disclosure.
Figure 3B:
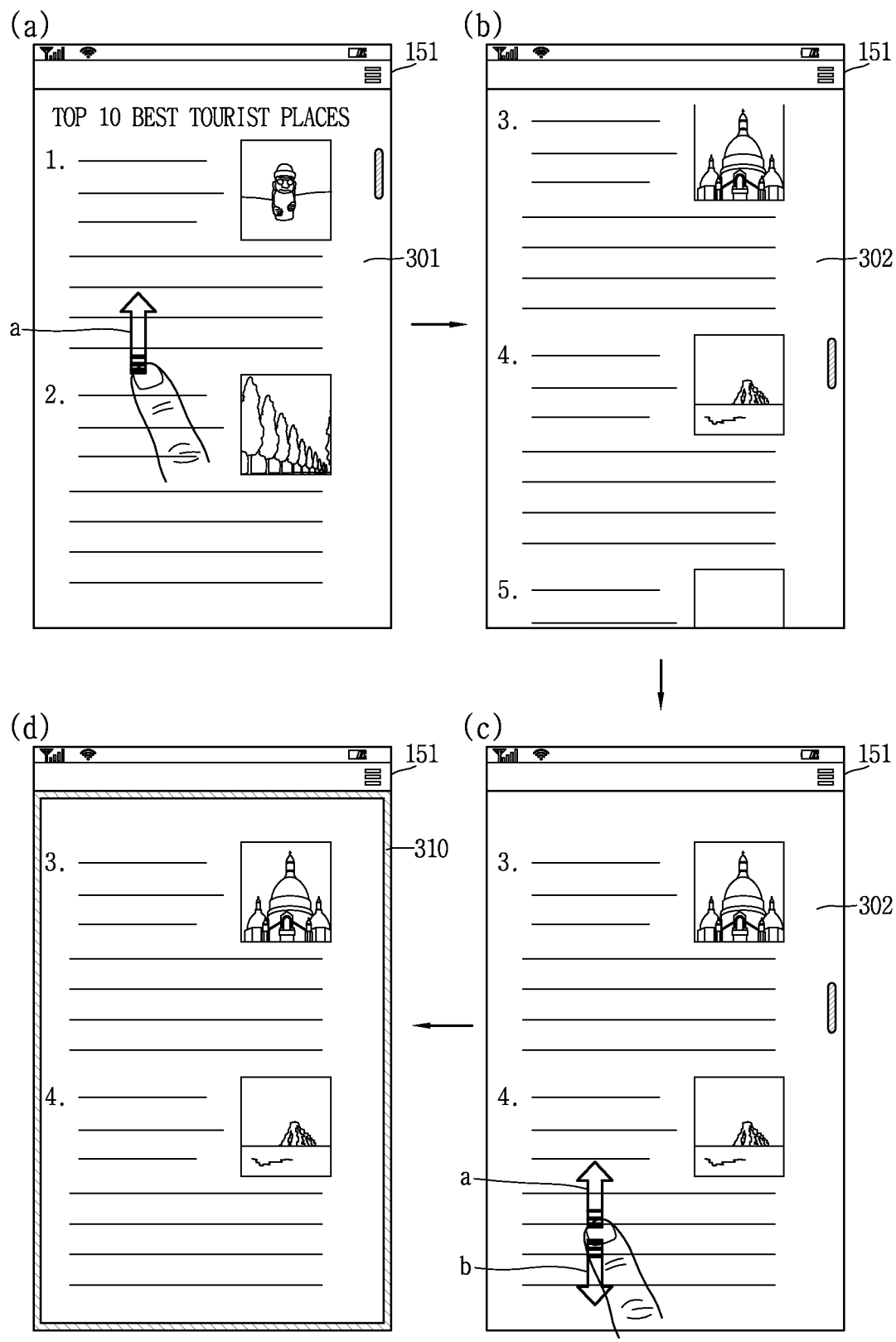
Figure 4:
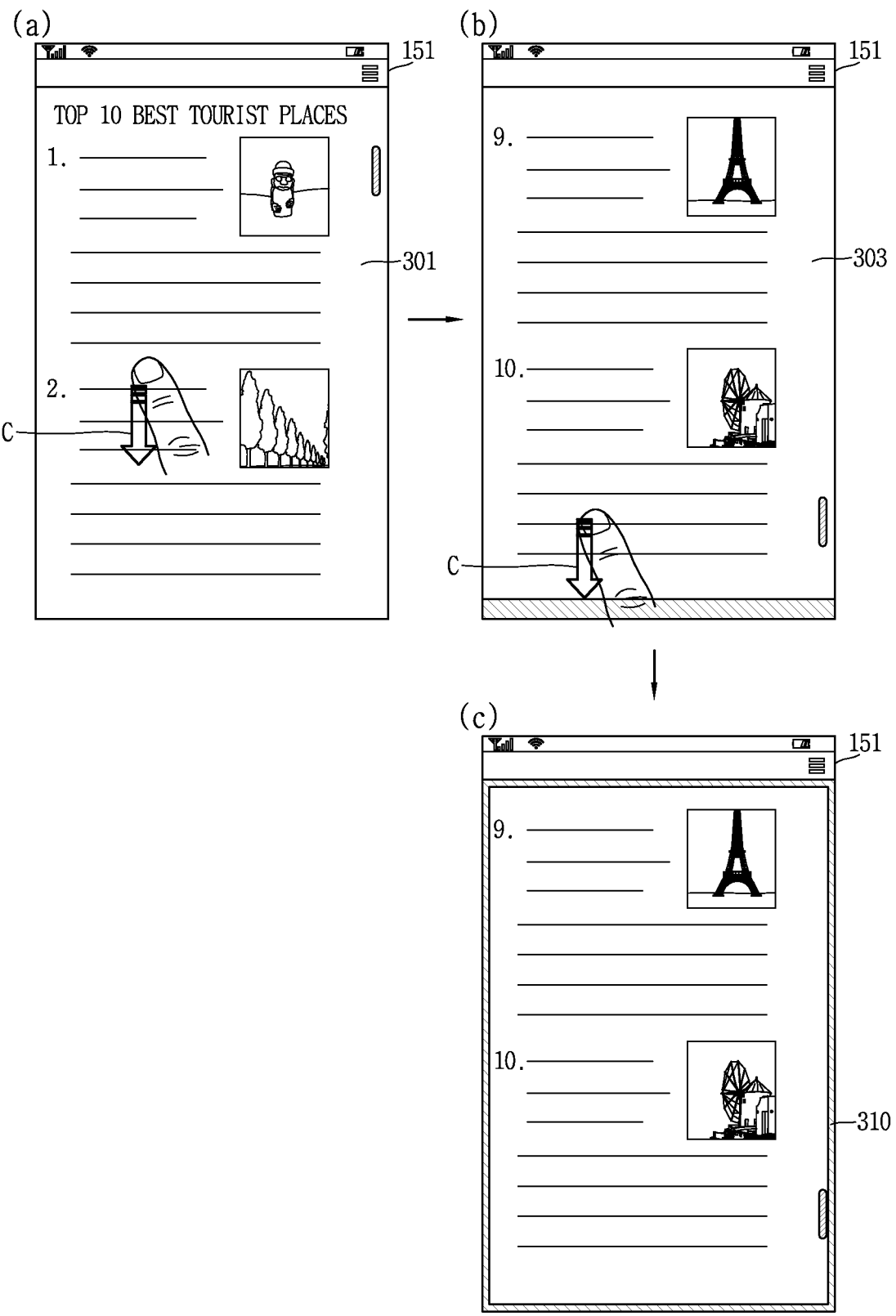

Hereinafter, a method of providing an additional function in addition to such a scroll function will be described in more detail with reference to the accompanying drawings. FIG. 2 is a flow chart for explaining a control method associated with the present disclosure, and FIGS. 3A, 3B and 4 are conceptual views for explaining a control method associated with a scroll function according to the present disclosure.

A mobile terminal according to the present disclosure may perform a scroll function for screen information displayed on the touch screen or perform an add function associated with screen information displayed on the touch screen based on a touch to the touch screen 151 in a state that any screen information is displayed on the touch screen 151. More specifically, according to the present disclosure, a plurality of control commands may be defined for the same type of touch, thereby performing different control even though the same touch is applied according to whether or not the same type of touch satisfies a predetermined condition.

First, in a mobile terminal according to the present disclosure, the process of displaying screen information on the touch screen 151 is carried out (S210) (refer to FIG. 2). Here, there may exist various types of screen information, regardless of their types if they are visual type of information that is displayable on the touch screen. For example, screen information may be an execution screen of an application, a home screen page, a lock screen, an execution screen associated with a specific function, and the like. For example, FIGS. 3 and 4 illustrate an example in which part of an electronic document corresponding to a webpage is displayed.

As described above, when a touch input linked to a scroll function is applied in a state that screen information is displayed on the touch screen, the controller carries out the process of determining whether or not the touch input satisfies a predetermined condition (S220).

Furthermore, as a result of the determination, when the touch input satisfies a predetermined condition, the controller 180 performs at least one add function associated with the displayed screen information (S230). Furthermore, when the touch input does not satisfy a predetermined condition, the controller 180 performs a scroll function for screen information currently displayed on the touch screen 151 (S240). Here, the touch input as a touch input linked to a scroll function may include a drag touch, a slide touch or a flick touch, for example.

As described above, according to the present disclosure, a condition may be set to a touch input for a scroll function, i) to execute an additional function for an application displayed on the touch screen or an electronic document linked to the screen information or an application associated with the screen information when a touch input for scroll satisfies a predetermined condition, and ii) perform a general scroll function when the touch input for scroll does not satisfy a predetermined condition, thereby performing a different control function.

On the other hand, in a mobile terminal according to the present disclosure, when a touch for a scroll function is applied but the touch for a scroll function does satisfy a predetermined condition, at least part of currently displayed screen information may be switched to at least another part thereof. Furthermore, when a touch to which the scroll function is allocated satisfies a predetermined condition, an additional function may be carried out, thereby providing a mobile terminal and a control method thereof capable of allowing a user to easily access an additional function.

On the other hand, in case of the foregoing case of i), when a touch input for the scroll satisfies a predetermined condition, a mobile terminal according to the present disclosure may perform a scroll function while at the same time executing the additional function.

More specifically, as illustrated in FIGS. 3A and 3B, when a touch input linked to a scroll function that does not satisfy a predetermined condition is applied, the controller 180 may change at least part of currently displayed screen information 301 to at least another part of screen information 302.

In other words, the controller 180 may move currently displayed information in one direction corresponding to a direction in which the touch is applied, and display at least part of currently non-displayed information on the touch screen.

As described above, screen information displayed on the touch screen 151 is moved in any one direction in response to a touch defined for a scroll function, and at least part of output object information is newly displayed on the touch screen 151 in connection with the movement. Here, output object information, as information linked to currently displayed screen information, denotes information that is displayable on the touch screen 151 when currently displayed information moves to disappear on the touch screen 151. For example, output object information may be information provided through a specific application, content, or information included in an electronic document. FIGS. 3 and 4 illustrate an example in which at least part of information included in an electronic document corresponding to a webpage is displayed.

As a virtual concept, screen information currently displayed on the touch screen 151 may be part of output object information (for example, information included in any one portion of an arbitrary page.) Furthermore, when a touch to which a scroll function is allocated is applied, the controller 180 may display another portion of the output object information (for example, another part of the arbitrary page) along a touch direction of the touch.

Here, information included in the arbitrary page may be output object information. Here, when screen information displayed on the touch screen 151 corresponds to the last portion of the arbitrary page, the controller 180 may no longer display the information of a portion included in the arbitrary page but different from the currently displayed screen information.

In other words, even though a touch linked to a scroll function is applied to the touch screen 151, when displayable information no longer exists along a specific direction corresponding to the touch, it may be regarded that there is no output object information corresponding to the specific direction. Accordingly, in this case, a scroll function may not be carried out, and currently displayed screen information may be continuously displayed even though a touch linked to the scroll function is applied.

Here, the arbitrary page may be defined as various concepts, such as an execution screen page of an application, a webpage, a processing unit of information, an information range corresponding to the same layer, and the like.

On the other hand, "moving screen information," or "changing screen information" or "switching screen information" may correspond to the meaning of "moving a page (or moving a display range of the page) to change a portion displayed on the display unit within an arbitrary page having a predetermined length or predetermined amount."

On the other hand, according to the present disclosure, a touch satisfying a predetermined condition (or a predetermined type of touch satisfying a predetermined condition) may be defined in various ways.

For an example, as illustrated in FIGS. 3A and 3B, when a first touch linked to a scroll function that does not satisfy a predetermined condition is applied in a first direction (a) on the touch screen, and accordingly, at least part of the screen information 301 displayed on the touch screen is changed to at least another part 302 thereof, a touch satisfying the predetermined condition may be a second touch having a speed above a predetermined speed in a second direction (b) (refer to FIG. 3C) opposite to the first direction (a).

Here, the touch mode of a first and a second touch may be any one of a drag touch, a slide touch and a flick touch. In this manner, when a second touch having a speed above a predetermined speed is applied in a second direction (b) opposite to the first direction (a), the controller may execute an additional function associated with screen information displayed on the touch screen 151.

Moreover, a touch satisfying the predetermined condition may be a drag touch, a slide touch or a flick touch for applying a touch at a speed below a predetermined speed in any one direction (for example, first direction (a)), and then applying a touch at a speed above a predetermined speed in an opposite direction to the any one direction within a predetermined period of time.

In this case, in a state that a drag touch is applied in any one direction (for example, direction "a"), when a drag touch is applied in a direction opposite to the any one (for example, direction "b", refer to FIG. 3B) within a predetermined period of time, the controller may perform an add function associated with the screen information. At this time, the scroll of screen information may be also carried out in response to the opposite direction.

In this case, the controller may perform a scroll function and an additional different function whether or not a touch in the opposite direction is applied at a speed above a predetermined speed.

For an example, when a touch in the opposite direction is applied at a speed below a predetermined speed, the controller may display a function icon corresponding to at least one of a backward function, a search function and a capture function. Furthermore, when a touch in the opposite direction is applied at a speed above a predetermined speed the controller 180 may display a function icon corresponding to a URL copy function.

Moreover, the controller 180 may perform scroll on screen information while at the same time performing a different function based on a drag touch in the opposite direction. A speed at which the screen information is scrolled may correspond to a touch speed of the drag touch in the opposite direction.

For another example, a touch satisfying a predetermined condition may be a drag or flick touch applied at a speed above a predetermined speed, regardless of the touch direction of the touch prior to applying the touch satisfying the predetermined condition.

For example, as illustrated in FIGS. 3A(a) and 3A(b), when a touch linked to a scroll function applied at a speed below a predetermined speed is applied, the controller switches at least part of the currently displayed screen information 301 to another screen information 302. Furthermore, as illustrated in the direction of FIG. 3A(c), when a touch in any direction (direction "a" or "b") is applied at a speed above a predetermined speed, the controller performs at least one add function associated with the screen information. In other words, in this case, when a touch linked to a scroll function is applied only at a speed above a predetermined speed regardless of the touch direction, the controller 180 may perform the additional function. On the other hand, according to the present disclosure, as described above, when a touch satisfying a predetermined condition is applied, the controller may not perform a scroll function for screen information displayed on the touch screen. In other words, even when a drag or flick touch having a speed above a predetermined speed is applied to the touch screen 151, the controller 180 may limit the scroll of screen information displayed on the touch screen. On the contrary, the controller may perform an additional function while at the same time scrolling screen information based on a touch satisfying the predetermined condition.

Furthermore, a touch satisfying a predetermined condition may be a touch for another scroll having an opposite direction to the touch direction of a touch applied for scroll. For example, when a touch in a direction "a" is applied as illustrated in FIG. 3A(a) and then a touch in a direction "b" opposite to the direction "a" is applied as illustrated in FIG. 3A(c), the controller may provide an additional function. At this time, the scroll of screen information may be also carried out in response to the opposite direction "b".

For example, referring to FIG. 3B, according to the present disclosure, the process (S310) of displaying screen information on the touch screen and the process (S320) of scrolling the screen information in one direction in response to a touch applied in a first direction (direction "a" in FIG. 3A) on the touch screen are carried out. When a touch input applied in a second direction (direction "b" in FIG. 3A) opposite to the first direction is detected on the touch screen, the process (S340) of determining whether or not a touch in the second direction is above a predetermined speed is carried out.

Furthermore, as a result of the determination, the process (S350) of performing a different function whether a touch input in the second direction is above or below a predetermined speed is carried out. At this time, a scroll function may be also carried out in the step S350.

In other words, during the step S350, the process of scrolling the screen information in another direction opposite to the one direction based on a touch input in the second direction, and performing a different function according to a touch speed of the touch input in the second direction is carried out.

In other words, the scroll of screen information may be carried out in an opposite direction to a scroll direction at the time of applying a touch in the direction "a". At this time, a speed at which screen information is scrolled may correspond to a touch speed of the touch in the second direction.

More specifically, when a touch speed of the touch input in the second direction is above a predetermined speed, the controller scrolls screen information displayed on the touch screen in another direction opposite to the one direction, and executes at least one first add function.

Furthermore, as a result of the determination, when a touch speed of the touch input in the second direction is below a predetermined speed, the controller scrolls screen information displayed on the touch screen in another direction opposite to the one direction, and executes a second add function different from the first add function.

The first add function may be a URL copy function of a webpage corresponding to screen information displayed on the touch screen, and the second add function may be an icon display function corresponding to a search function, a capture function and the like.

On the other hand, for an another example, a touch satisfying a predetermined condition may be a touch linked to a scroll function applied to a side at which output object information no longer exists in a state that screen information corresponding to the last portion 303 of the output object information is displayed on the touch screen 151 as illustrated in FIGS. 4A and 4B. At this time, the touch satisfying a predetermined condition may be also a touch linked to a scroll function applied to a side at which output object information no longer exists at a speed above a predetermined speed.

In this manner, when a touch satisfying a predetermined condition is applied, the controller 180 may perform an add function associated with screen information displayed on the touch screen as illustrated in FIG. 4C.

In other words, in a state that the screen information is moved on the touch screen to sequentially display output object information along the touch direction (for example, refer to direction "c" in FIG. 4) of a predetermined type of touch applied to the touch screen, and screen information corresponding to the last portion of the output object information is displayed on the touch screen, when the predetermined type of touch is additionally applied along the touch direction (for example, refer to direction "c" in FIG. 4), the controller 180 may perform an add function linked to screen information displayed on the touch screen.

As described above, a mobile terminal according to the present disclosure may perform an additional function associated with screen information currently displayed on the touch screen, an electronic document including the screen information or an application associated with the screen information in response to a touch (hereinafter, referred to as a "touch satisfying a predetermined condition") linked to a scroll function satisfying a predetermined condition being applied thereto.

On the other hand, according to the present disclosure, a state in which a touch satisfying a predetermined condition is applied to execute an additional function may be expressed as that "the terminal is in a specific mode," or "the terminal is entered in a specific mode.". In other words, according to the present disclosure, a specific mode may be activated in response to a touch satisfying a predetermined condition, and an additional function associated with screen information linked to screen information displayed on the touch screen, an electronic document containing the screen information or an application corresponding to the screen information may be carried out while the specific mode is in an active state. Meanwhile, according to the present disclosure, "activating the specific mode" in itself can be understood to execute an additional function.

On the other hand, according to the foregoing examples, a case where the specific mode is activated when a touch satisfying a predetermined condition is applied to the touch screen has been described, but the present disclosure may not be necessarily limited to this. In other words, the specific mode may be activated based on selecting a specific key (touch key or hardware key) provided in the terminal. For another example, the specific mode may be activated based on receiving a predetermined voice command. For still another example, the specific mode may be activated based on sensing a user's gesture. The user's gesture may be sensed through various sensors provided in the terminal. Furthermore, the specific mode may be automatically activated under the control of the controller 180. In other words, when the use status of the terminal is in a valid state for activating a specific mode, the controller 180 may activate the specific mode. Furthermore, the specific mode may be activated in various ways in addition to the foregoing examples.

On the other hand, in a mobile terminal according to the present disclosure, when a touch satisfying the foregoing predetermined condition is applied, the controller 180 may display a notification image 310 (guide image, specific image or graphic image) as illustrated in FIGS. 3D and 4C, to allow the user to recognize that the foregoing additional function can be executed. In other words, when the specific mode is activated, the controller 180 displays the notification image 310. The notification image 310 may be continuously displayed while the specific mode is in an active state. Furthermore, when the specific mode is deactivated, the notification image may be no longer displayed.

On the other hand, there may be various cases of deactivating the activated specific mode, and for example, the specific mode may be deactivated based on a user's request, automatically deactivated under the control of the controller or deactivated when there is no input of a control command input for a predetermined period of time.

As described above, a mobile terminal according to the present disclosure may execute an additional function associated with screen information linked to screen information displayed on the touch screen, an electronic document containing the screen information or an application corresponding to the screen information using a touch linked to a scroll function, and hereinafter, such an additional function will be described in more detail with reference to the accompanying drawings. FIGS. 5A, 5B, 5C, 5D, 6A, 6B and 6C are conceptual views for explaining an additional function according to still another embodiment scroll according to the present disclosure.

Figure 5A:
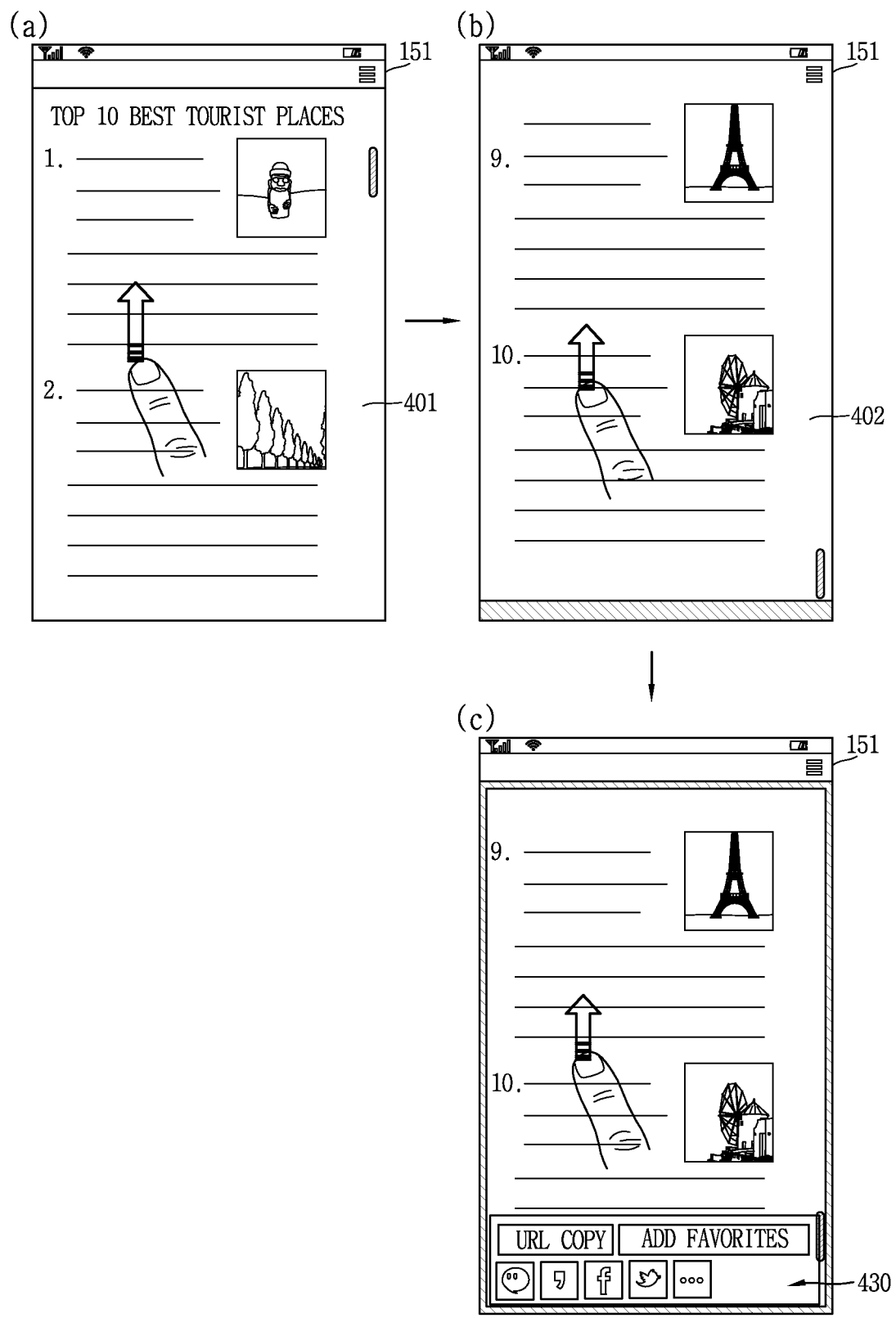
FIGS. 5A, 5B, 5C, 5D, 6A, 6B and 6C are conceptual views for explaining an additional function according to still another embodiment scroll according to the present disclosure.

For an example, when a touch input applied to the touch screen satisfies a predetermined condition as illustrated in FIGS. 5A(a) and 5A(b) (a touch satisfying a predetermined condition as described in FIG. 4 is illustrated on the present drawing, but the present disclosure may not be necessarily limited to this), the controller 180 may display a graphic object (or icon) associated with at least one add function in one region 430 on the touch screen as illustrated in FIG. 5A(c). A function allocated to such a graphic object, respectively, may be a function processed in connection with screen information displayed on the touch screen or an electronic document (or application) corresponding to the screen information. For example, the add function may include a URL copy function, a send function, a messenger function, a share function, a capture function, a search function, a favorite add function, and the like. When any one of the send function, messenger function, and share function is selected, the controller may send or share the displayed screen information or an electronic document corresponding to this. Furthermore, when a memo function is selected, the controller may use at least part of screen information or electronic document displayed on the touch screen as a background image of the memo function. At this time, information written on a memo (or note) through a touch or the like may be displayed to overlap with the background image.

As described above, in a mobile terminal according to the present disclosure, it may be possible to provide at least one function that is executable using currently displayed screen information or its related electronic document in response to a touch satisfying a predetermined condition. At this time, the at least one function may be automatically carried out even without the user's selection. Furthermore, the at least one function may be carried out based on the user's selection.

On the other hand, there may be various modes of displaying graphics object for such functions. For example, the controller 180 may display a window in one region (for example, one edge region) 430 of the display unit, and allow the window to include graphic objects.

On the other hand, the controller may also provide only a graphic object for a specific function among the foregoing various types of functions.

Figure 5B:
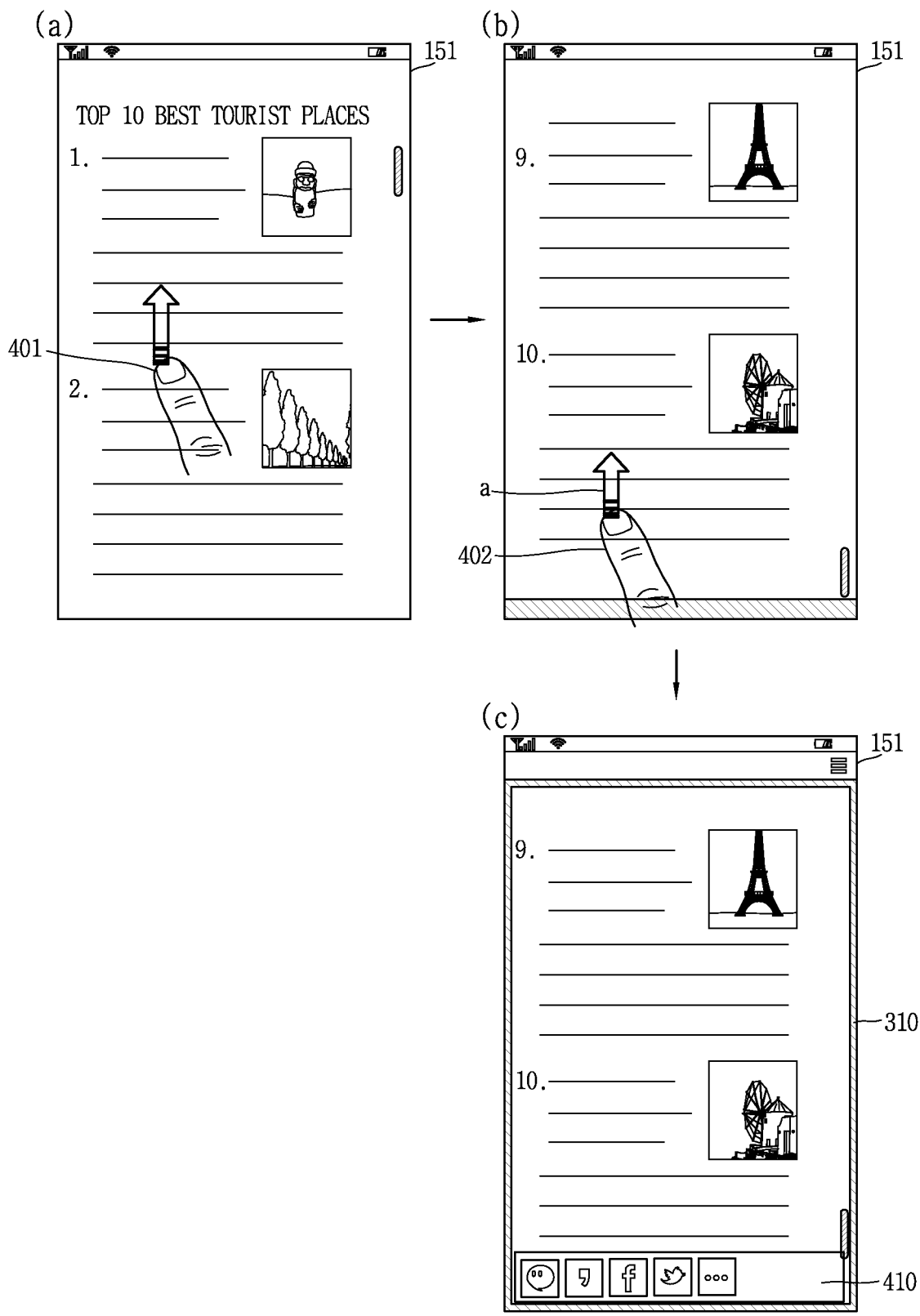

For a specific example, considering an example of performing a share function, when a touch input applied to the touch screen satisfies a predetermined condition as illustrated in FIGS. 5B(a) and 5B(b), the controller 180 may perform a function of sharing screen information 401 currently displayed on the touch screen or an electronic document (for example, a webpage as illustrated in the drawing) containing the screen information as illustrated in FIG. 5B(c). To this end, the controller 180 may display an icon 410 corresponding to at least one application, respectively, associated with a share function as illustrated in FIG. 5B(c). The controller 180 may transmit the screen information of a portion displayed on the display unit, an electronic document containing the screen information in itself or a URL address of the electronic document (or webpage) to a prespecified counterpart. Meanwhile, when an electronic document itself is shared, the electronic document may be transferred to the counterpart as an attached file. Meanwhile, there may be various types of shared files, and they may be determined by the user's selection. There may exist various types of shared files such as an image, a text file, a word file, a PDF file or the like.

On the other hand, as illustrated in FIGS. 5B(a) and 5B(b), when a touch satisfying a predetermined condition is applied, the controller 180 may display a notification image 310 for notifying that the additional function is executable as illustrated in FIG. 5B(c).

On the other hand, though not shown in the drawing, the controller may display a function icon that can be displayed or a function icon that has been displayed in connection with screen information displayed on the touch screen though not being currently displayed on the touch screen in response to the application of a touch satisfying the predetermined condition.

For example, when an electronic document corresponding to an arbitrary new article is selected to be displayed on the touch screen, a function icon corresponding to at least one function (for example, a share function, a capture function, etc.), respectively, may be displayed at an upper end of the electronic document. Furthermore, the function icon may be no longer displayed on the touch screen as screen information is scrolled. Furthermore, the controller 180 may display the function icon again in response to a touch satisfying the predetermined condition. At this time, a display range of the screen information may not be changed to display only a function icon on the touch screen.

There may be various positions at which the function icon is displayed, but for the convenience of the user's selection, the function icon may be displayed, on the touch screen, in a region adjacent to a region to which a touch is applied.

Considering another example of providing an additional function, the controller may immediately execute a specific function other than a method of displaying a graphic object (or icon) for selecting the specific function as described above.

Here, a specific function may be determined based on the user's selection. For example, according to the present disclosure, a function to be executed may be set based on the user's selection when the predetermined condition is satisfied.

Furthermore, the specific function may vary according to the type of screen information displayed on the touch screen. It may be determined under the control of the controller. For example, when the screen information corresponds to a webpage, the controller may perform a URL copy function of the webpage in response to a touch satisfying the predetermined condition. In addition, when the screen information is an execution screen of an application, the controller may perform a screen capture function in response to a touch satisfying the predetermined condition.

Figure 5C:
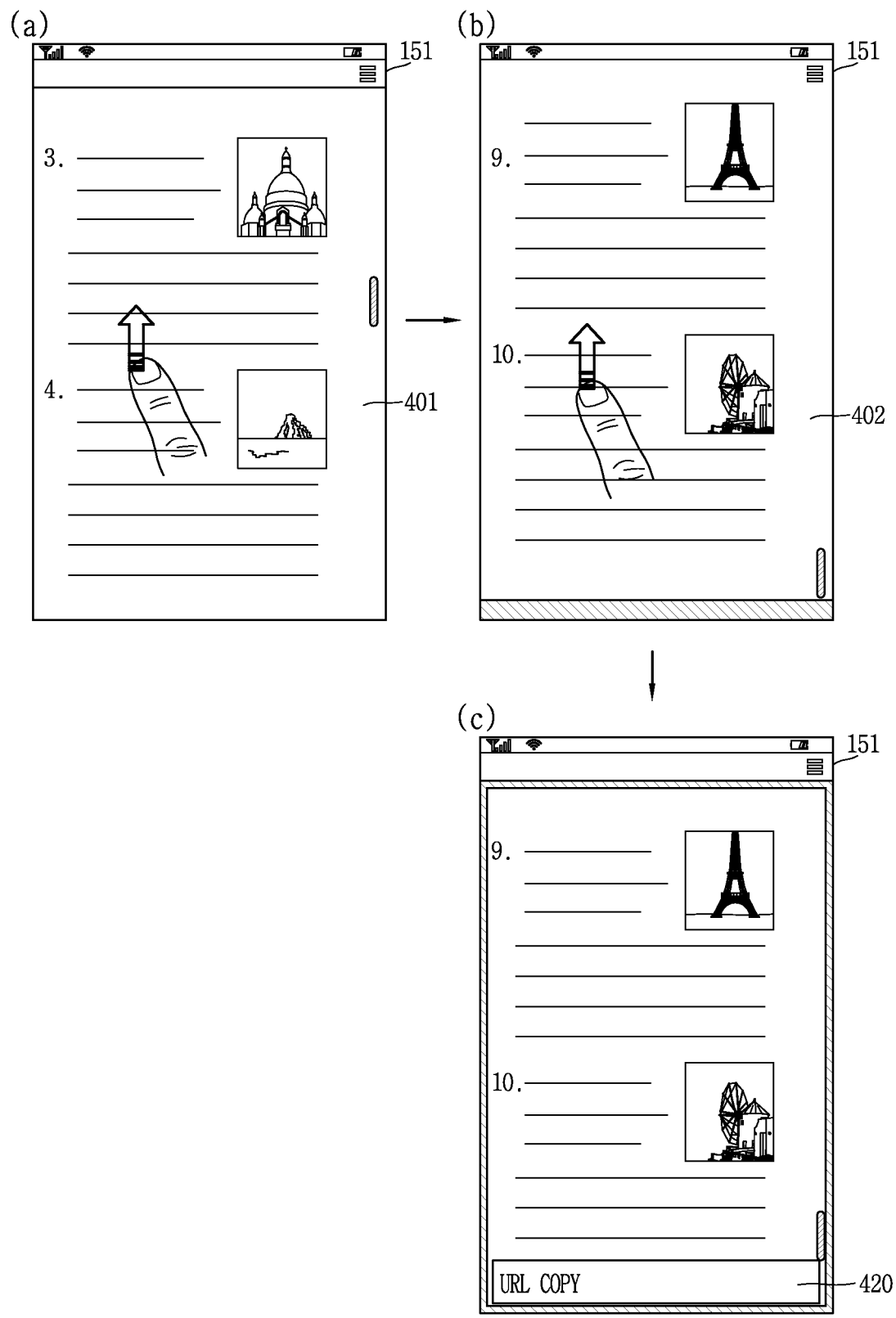

On the other hand, an example of executing a specific function in response to a touch satisfying a predetermined condition will be described below. Here, the specific function will be described as a URL copy function, for example. For example, when a touch satisfying a predetermined condition is applied, the controller may executed a predetermined specific function. Considering an example of executing a URL copy function, as illustrated in FIG. 5C, when screen information displayed on the touch screen is at least part of a specific webpage, the at least one add function may be a function of copying a uniform resource locator (URL) address of the specific webpage. On the other hand, as illustrated in FIGS. 5C(a) and 5C(b), when a touch satisfying a predetermined condition is applied, the controller 180 may display a notification image 310 for notifying that currently displayed screen information and the additional function can be carried out. The URL address may be copied to a clipboard, and a paste function may be carried out according to the user's need.

On the other hand, when the URL address copy is completed, the notification image 310 may disappear. In this case, a specific mode performing an additional function may be activated in response to a touch satisfying the predetermined condition, and released when a function of copying a URL address is completed.

On the other hand, in this case, the user may execute a specific function (for example, URL copy function) only when applying a touch satisfying a predetermined condition, thereby reducing the inconvenience of searching and selecting a menu for executing a specific function.

Figure 5D:
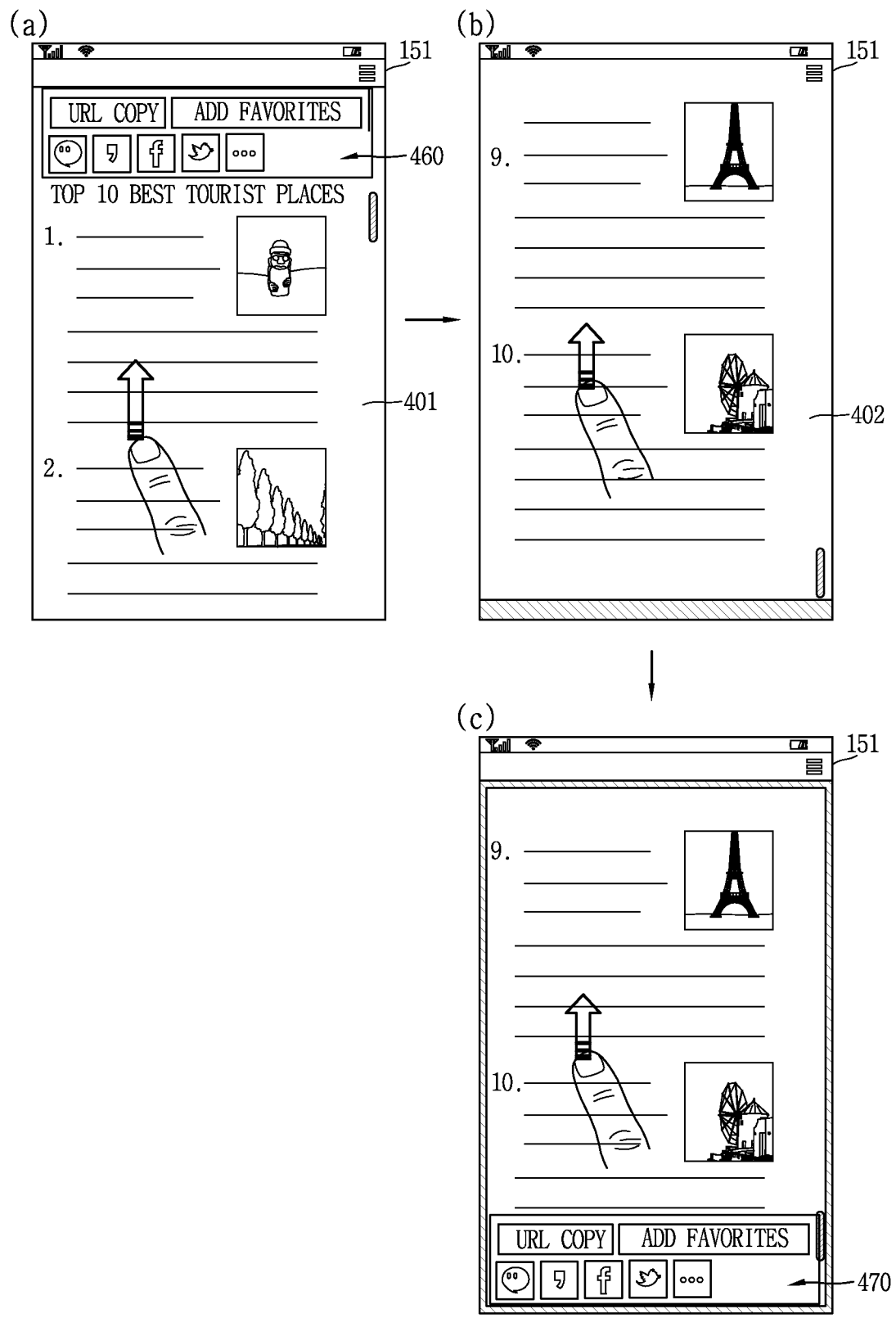

Furthermore, considering another example of an additional function, when a touch satisfying a predetermined condition is applied as illustrated in FIGS. 5D(a) and 5D(b), the controller 180 may display at least part 460 (refer to FIG. 5D(a)) of information included in an upper end of the output object page along with currently displayed screen information as illustrated in FIG. 5D(c).

The controller 180 may extract information that can be commonly used on an output object page among information included in an upper end of the page to display it in one region on the touch screen. At this time, the controller may analyze information included in the output object page to extract commonly usable information. Here, commonly usable information may include a function icon corresponding to a function carried out in connection with the displayed screen information.

In this case, the user may apply a touch satisfying a predetermined condition even without scrolling screen information again to a portion including a function icon to select the function icon in order to perform a function associated with screen information. Accordingly, it may be possible to reduce a time for browsing a function icon.

On the other hand, a mobile terminal according to the present disclosure may provide an add function based on an additionally applied touch in a state that a specific mode is activated in response to a touch satisfying a predetermined condition with respect to the touch screen.

Figure 6A:
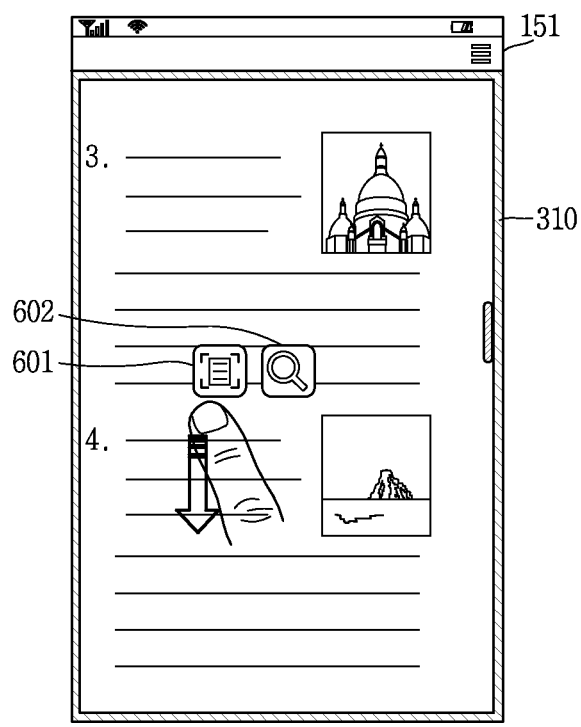

For example, as illustrated in FIG. 6A, the controller 180 may activate a specific mode in response to a touch satisfying a predetermined condition. The active state of the specific mode may be identified through the display of the notification image 310.

On the other hand, the controller 180 may monitor the touch speed of a touch linked to a scroll function applied to the touch screen 151 while the specific mode is in an active state. Furthermore, when the touch speed of a touch linked to the scroll function corresponds to the touch speed linked to a specific function, the controller 180 may display icons for the execution of the specific function. For example, when the touch speed of a touch linked to a scroll function is a touch speed corresponding to the user's intention of searching or browsing specific information while scrolling the screen information, the controller may display an icon 602 for executing a search function. Here, the touch speed and information on a function according to the user's intention may exist as matching information that has been prematched on the memory 170.

On the other hand, only when a specific mode is activated, the controller may of course provide an icon for an additional function all the time.

Such a search function icon 602 may be displayed adjacent to a position to which a touch is applied on the touch screen to facilitate the user's selection.

On the other hand, though not shown in the drawing, when the search function icon 602 is selected, the controller may search information on at least part of the screen information selected by the user through a predetermined search engine.

Furthermore, the controller may provide a capture function in response to a touch linked to a scroll function applied to the touch screen 151. The capture function may be provided in a state that a specific mode is activated. The controller may provide a capture function along with providing the search function or in an additional manner. Here, the capture function may denote storing at least part of screen information in an image or another format.

As illustrated in FIG. 6A, an icon 601 linked to a capture function may be displayed on the touch screen, and a capture function icon 601 may be displayed adjacent to a position to which a touch is applied on the touch screen to facilitate the user's selection.

Figure 6B:
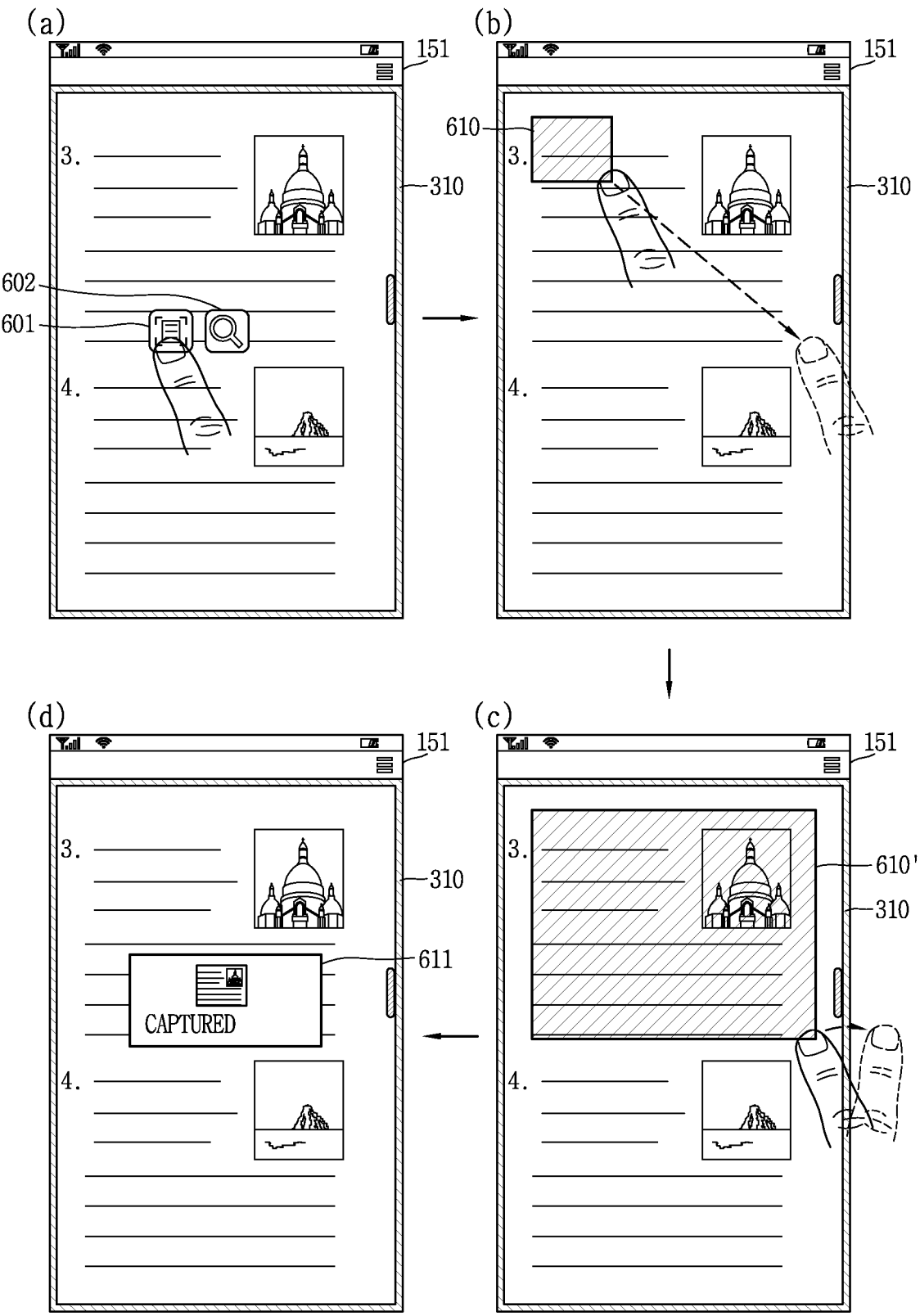

On the other hand, as illustrated in FIG. 6B, when the capture function icon 601 is selected as illustrated in FIG. 6B (a), a graphic object 610 for selecting a capture object region may be displayed. The controller 180 may capture information on a portion overlapping with the graphic object 610 on the screen information. Meanwhile, the graphic object 610 may be enlarged or reduced in response to a predetermined touch (for example, drag touch) to the graphic object 610 as illustrated in FIGS. 6B(b) and 6B(c). In this manner, the graphic object 610 may be enlarged or reduced to allow the user to set a capture object region.

On the other hand, the graphic object 610 may be of course moved based on the user's selection. In this manner, when a capture object region is specified 610' through the setting of the graphic object 610, the controller 180 may capture screen information corresponding to a capture object region based on the user's request as illustrated in FIG. 6B(d).

Here, the user's request may be received in various ways, and for an example, when a touch to the graphic object 610 or 610' is released as illustrated in FIG. 6B(c), the controller 180 may process it as a user's request.

Furthermore, the user's request may be a predetermined type of touch (for example, long touch) additionally applied to the graphic object subsequent to releasing a touch to the graphic object 610 or 610'. In addition, the user's request may be received based on the selection of a voice command, a user gesture, a hardware key or touch key.

Figure 6C:
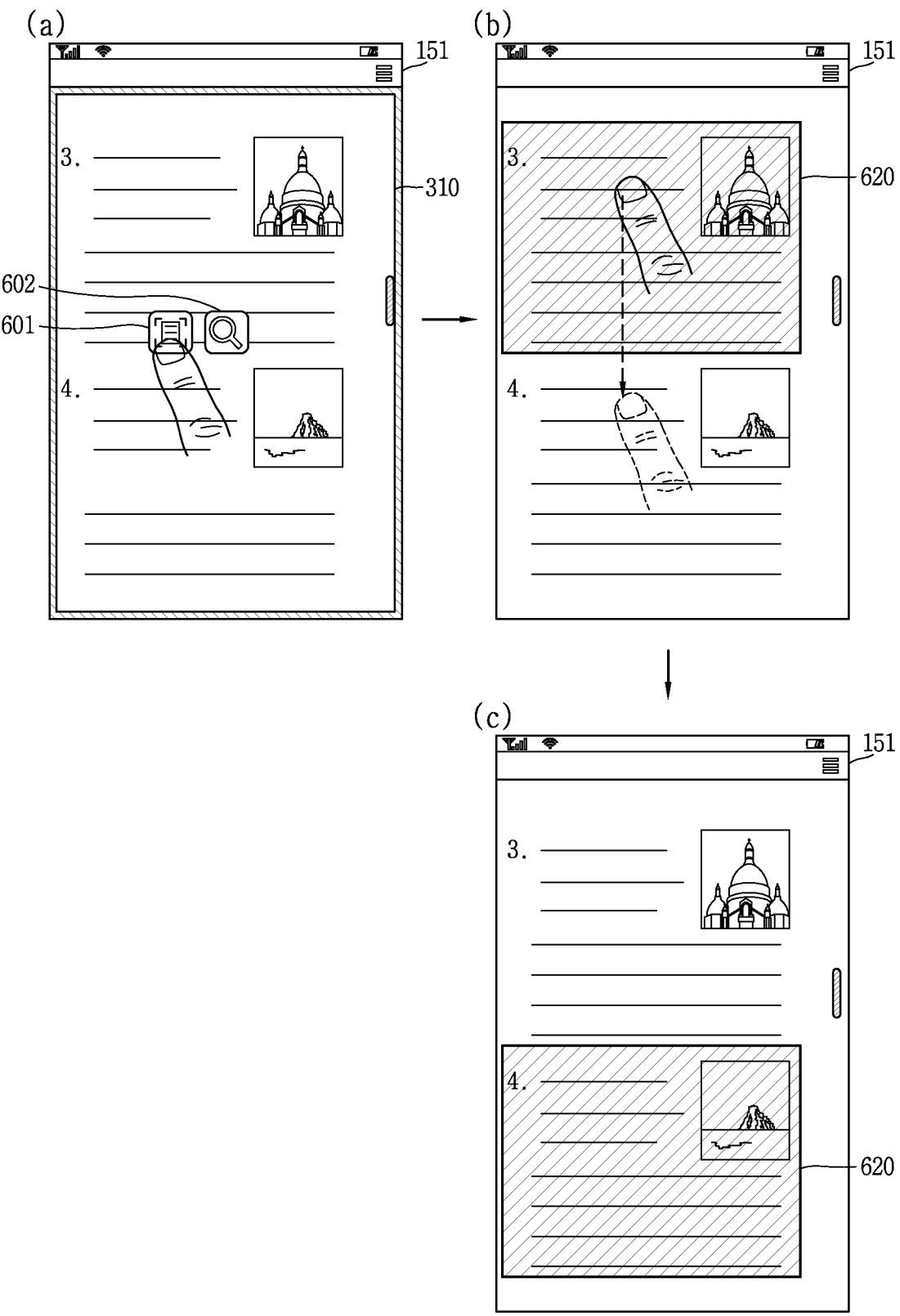

On the other hand, when a capture function icon 601 is selected as illustrated in FIG. 6C(a), a mobile terminal according to the present disclosure may display a graphic object 620 in an arbitrary capture object region as illustrated in FIG. 6C(b). Here, the arbitrary capture object region may be specified based on a paragraph, a sentence or a context (for example, whether it is a text or image). For example, as illustrated in FIG. 6C(b), the controller 180 may divide a plurality of capture object regions based on a paragraph, and display the capture image 620 in any one region of them. The capture image 620 may move to another region other than a currently overlapped region among the plurality of capture object regions, as illustrated in FIG. 6C(c), based on a predetermined type of touch (for example, drag touch) to the graphic object. In this manner, when a graphic object is moved, capture object information is also changed.

Furthermore, the controller 180 may capture screen information corresponding to a capture object region based on the user's selection. Here, the user's request may be received in various ways, and received through a predetermined type of touch to the graphic object or a predetermined type of touch to the touch screen. In addition, the user's request may be received based on the selection of a voice command, a user gesture, a hardware key or touch key.

As described above, a mobile terminal according to the present disclosure may provide a function processed using currently displayed screen information, thereby allowing the user to more intuitively access an additional function while continuously using current screen information.

On the other hand, in the foregoing description, a case where a specific mode is activated has been described as an example, but the present disclosure may not be necessarily limited to this, and may perform the foregoing function even when a specific mode is not activated. In other words, when the touch speed of a touch for scroll corresponds to a touch speed for browsing screen information, the controller 180 may provide an additional function associated with browsing. Furthermore, only when a touch for scroll is applied, the controller 180 may of course provide an additional function. Here, the additional function may include a search function and a capture function.

Hereinafter, conceptual views for explaining a method of providing information on a user's interested portion are illustrated. FIGS. 7A, 7B, 7C and 7D are conceptual views for explaining a method of providing user's information of interest in a mobile terminal according to the present disclosure.

A mobile terminal according to the present disclosure may provide a function described below in response to a touch satisfying the foregoing predetermined condition. According to the present disclosure, when a touch satisfying the predetermined condition is applied, it may be expressed as that a specific mode is activated. The specific mode being activated may be recognized by the user through displaying the notification image 310 as illustrated in FIG. 7A(a).

On the other hand, the present disclosure may not be necessarily limited to this, and may perform a function described below even when a specific mode is not activated.

A mobile terminal according to the present disclosure may process information for which a period of time displayed on the touch screen is above a predetermined period of time among screen information displayed on the touch screen as the user's information of interest. In other words, the controller 180 may determine information that has been displayed for more than a predetermined period of time on the touch screen as information that has been viewed for a long period of time by the user, and store it as the user's information of information.

Figure 7A:
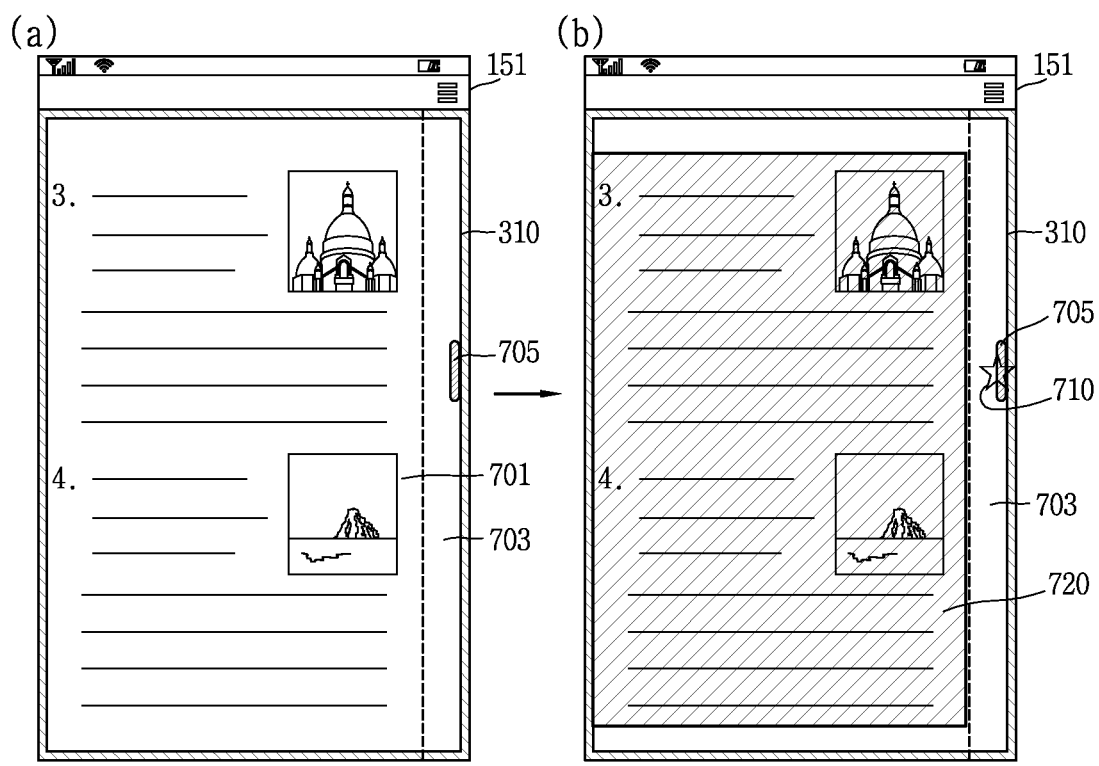
FIGS. 7A, 7B, 7C and 7D are conceptual views for explaining a method of providing user's information of interest in a mobile terminal according to the present disclosure.

For example, as illustrated in FIG. 7A(a), the controller 180 may count a display maintaining time of screen information displayed on the touch screen among information included in an electronic document, and generate log information (or log) on screen information for which the display maintaining time satisfies a predetermined criteria among screen information 701 that have been displayed on the touch screen. Here, log information may include at least one of coordinate information on which a portion satisfying the predetermined criteria is located at which portion of the relevant electronic document and information on a display maintaining time of the portion satisfying the predetermined criteria. A scroll bar for changing a display range of screen information (or display range of an electronic document) displayed on the touch screen may be displayed on the touch screen 151. FIG. 7A illustrates a scroll region 703 instead of the scroll bar, and the scroll region may include indicators associated with scroll.

The scroll region 703 may include a first indicator 705 indicating a position at which currently displayed screen information is included in the electronic document, and moreover, the scroll region 703 may include a second indicator 710 indicating a position at which the screen information 701 of a portion at which the log information is generated on the specific electronic document as illustrated in FIG. 7A(b). On the other hand, though the scroll bar is not illustrated in FIGS. 7A and 7B, the position of the first indicator 705 is determined according to a portion at which currently displayed screen information among output object information is included in an edge region 703 corresponding to a length direction of the terminal corresponding to a display direction of screen information.

Moreover, the controller 180 may display a graphic object 720, as illustrated in FIG. 7A(b), at a portion corresponding to screen information for which a display maintaining time satisfies a predetermined criteria. The graphic object 720 may have a transparency to the extent of identifying screen information. Meanwhile, an external appearance image of the graphic object 720 may vary according to a display maintaining time of screen information corresponding to a portion overlapping with the graphic object 720. The controller may display a graphic object indicating more usability on a graphic object overlapping with screen information having a relatively long display maintaining time among a plurality of screen information. In other words, the controller 180 may provide a faded visual effect to a portion of screen information having the longest display maintaining time.

Figure 7B:
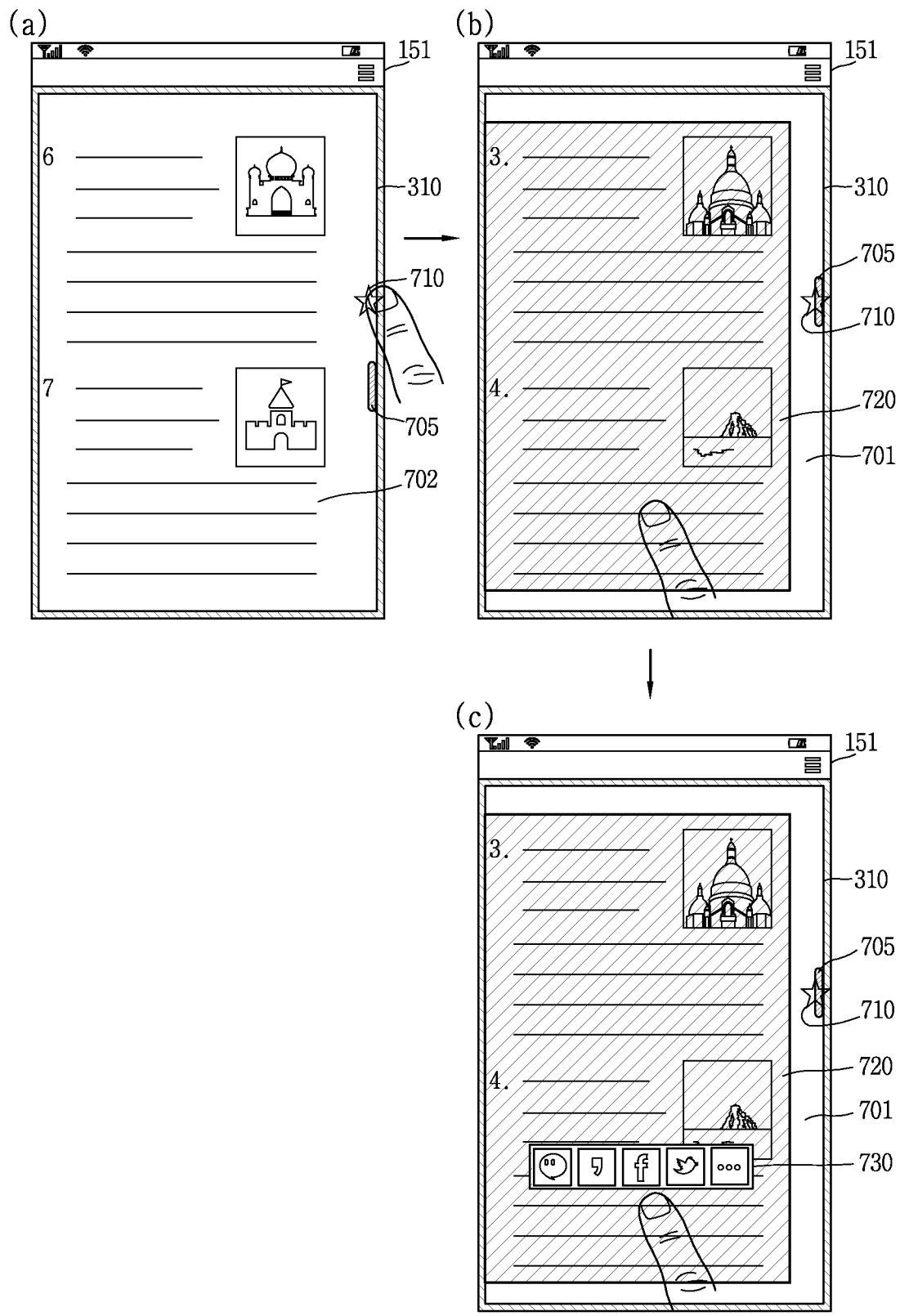

On the other hand, when the second indicator 710 is selected even though another portion of screen information 702 is displayed as illustrated in FIG. 7B(a), the controller 180 may control the touch screen to display screen information 701 of a portion indicated by the second indicator 710 or a portion corresponding to the second indicator 710 as illustrated in FIG. 7B(b). In other words, the controller 180 may switch currently display screen information 702 to screen information (or information of interest) 701 of a portion generated with the log information in response to the selection of the second indicator 710.

On the other hand, as illustrated in FIG. 7B(c), the controller 180 may display a function icon 730 for at least one function processed in connection with the screen information in response to the redisplay of the screen information (or information of interest) 701 of a portion generated with the log information or in response to a predetermined type of touch to the screen information (or information of interest) 701 of a portion generated with the log information. Here, the at least one function may include at least one of a share function, a capture function and a memo function. When any one function is selected through the function icon 730, the controller may process the selected function in connection with the screen information (or information of interest) 701 of the screen information (or information of interest) 701 of a portion generated with the log information.

On the other hand, there may exist at least one user's memorable item on a list containing a plurality of items such as an email. In this case, when a portion that does not contain at least one memorable item is displayed on the current touch screen, the user should perform a burdensome process for scrolling the list again to find a memorable item.

Figure 10A:
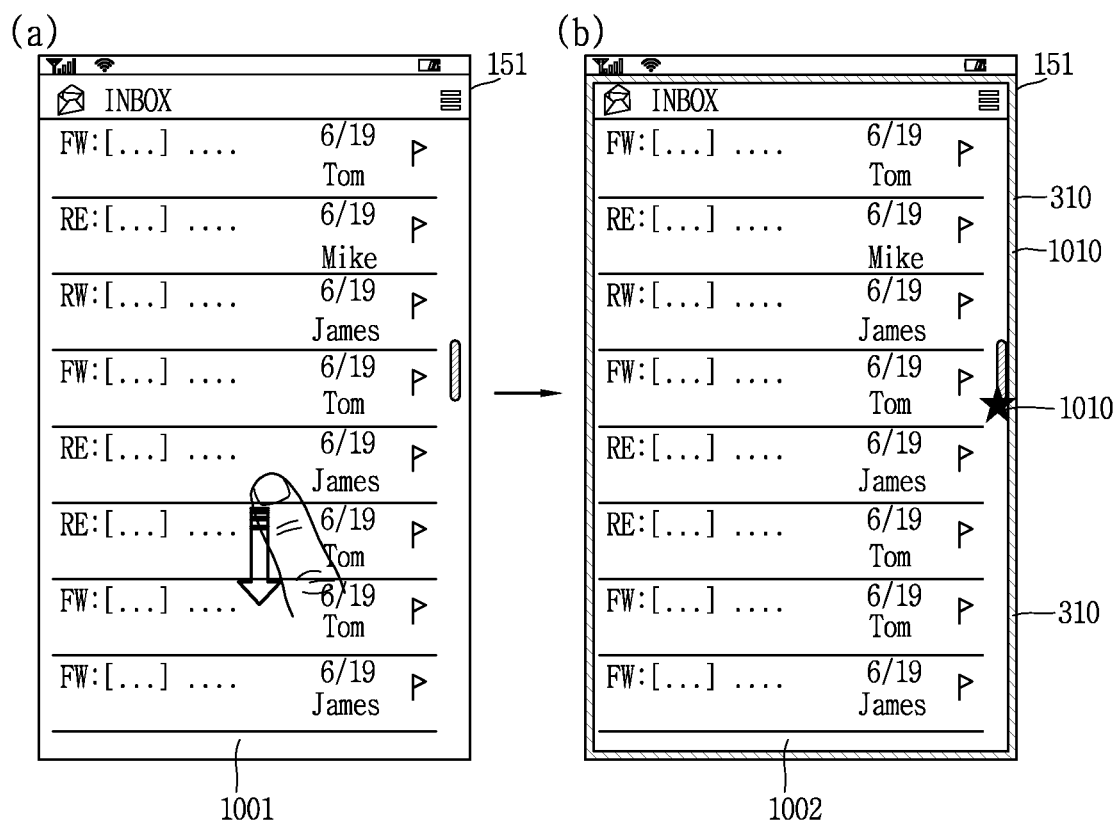
FIGS. 10A, 10B, 10C, 10D, 10E, 11A and 11B are conceptual views for explaining a scroll function according to the present disclosure, for example, on email information.

Accordingly, in order to resolve the inconvenience, the present disclosure may display an indicator 1010 (refer to FIG. 10A(b)) at a position containing a user's memorable portion on a scroll bar region 1003, thereby allowing the user to immediately use a portion containing the relevant item.

Furthermore, the present disclosure may display an indicator 710 (refer to FIG. 7A(b)) at a position containing a user's memorable item in a scroll bar region 703 based on the user's selection, thereby allowing the user to immediately use an electronic document at the relevant portion. For example, when a predetermined type of touch (for example, long touch) is applied to the indicator region 703 in a state that arbitrary screen information 701 is displayed, the controller 180 displays the indicator 710. Here, the indicator may be displayed in a region displayed with an indicator 705 indicating the display position of a currently displayed electronic document. On the other hand, the indicator 710 may be removed based on the user's request. For example, when another type of touch (for example, drag touch) is applied to the indicator, the controller 180 may no longer display the indicator 710.

Figure 7C:
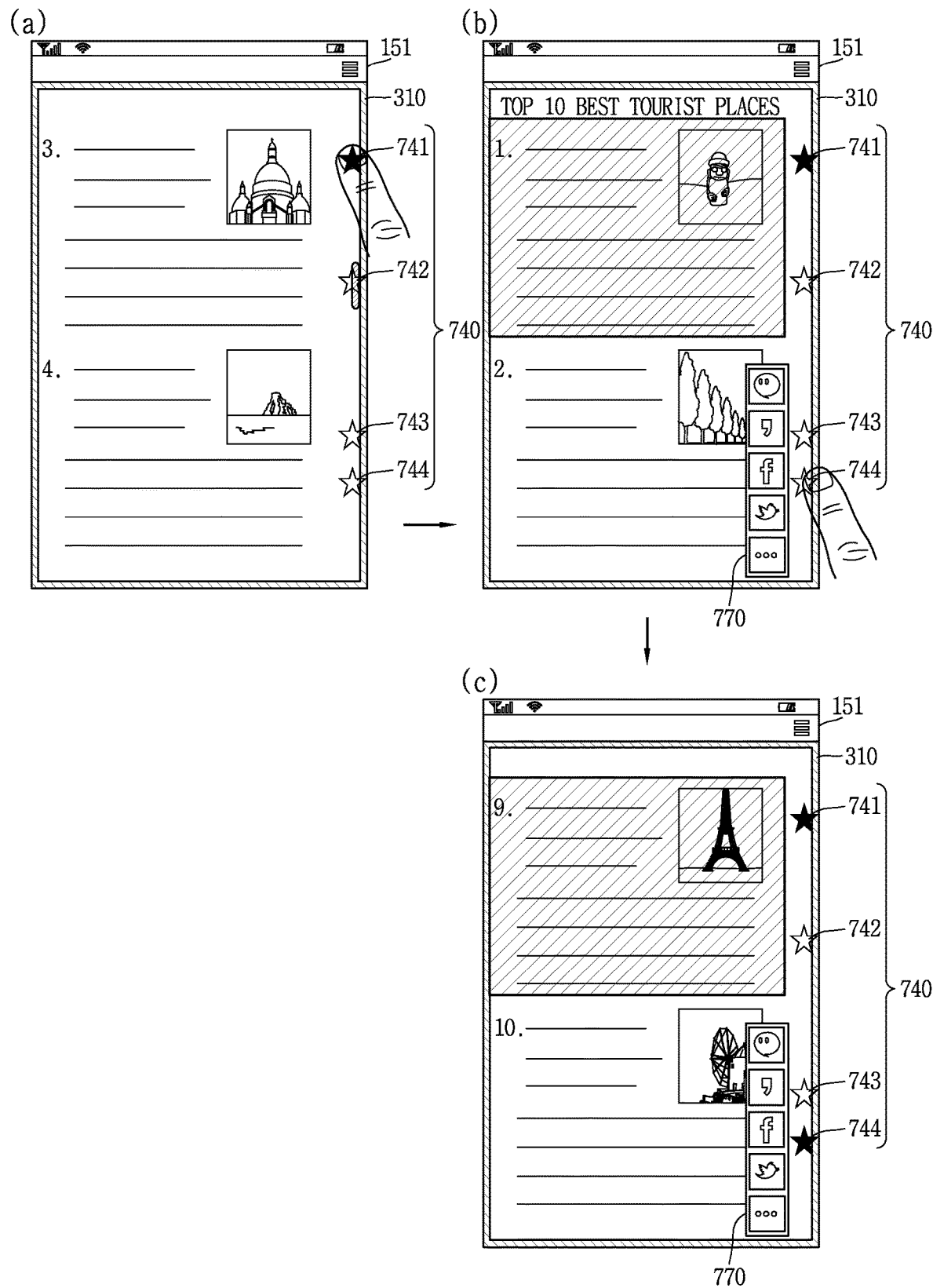

On the other hand, as illustrated in FIG. 7C, the screen information of a portion generated with log information may include a plurality of portions in an electronic document. In this case, as illustrated in FIG. 7C, the controller 180 may display indicators 741, 742, 743, 744 corresponding to portions including screen information corresponding to a portion generated with log information, respectively. Furthermore, when any one indicator 741 is selected, as illustrated in FIG. 7C(b), the controller 180 displays screen information at a portion corresponding to the selected indicator 741. Meanwhile, the controller 180 may control the terminal to select a plurality of indicators among the indicators 741, 742, 743, 744. When a plurality of indicators are selected, screen information corresponding to the plurality of selected indicators may be selected. The screen information of the plurality of portions may be processed in connection with an arbitrary function selected by the user.

For example, when a first and a fourth indicator 741, 744 are selected from the first, the second, the third and the fourth indicator 741, 742, 743, 744, the controller 180 may process a function selected by the user using screen information corresponding to the first and the fourth indicator 741, 744, respectively. For example, when a share function is selected by the user, the controller 180 may share screen information corresponding to the first and the fourth indicator 741, 744, respectively, with a pre-specified counterpart. At this time, screen information corresponding to the first and the fourth indicator 741, 744, respectively, may be transmitted to the pre-specified counterpart or server or specific SNS.

On the other hand, there may be various methods of selecting the indicator, and as illustrated in the drawing, the controller 180 may process the relevant indicator to be selected in response to a predetermined type of touch (for example, long touch) to the indicator. At this time, the color of the selected indicator may be changed from that prior to being selected. In other words, the visual appearance of the selected indicator may be changed from that prior to being selected. Meanwhile, though not shown in the drawing, when a predetermined type of touch (for example, long touch) is applied to any one indicator, the controller 180 may allocate a select region to select each indicator. An image may be displayed on the select region, thereby allowing the user to recognize the select region. Furthermore, when a touch is applied to the select region, the controller 180 may process an indicator and screen information corresponding to the select region to which the touch is applied to be selected. Meanwhile, the select region may be also referred to as a select box or check box.

On the other hand, a mobile terminal according to the present disclosure may provide user's information of interest on a separate page. At this time, the controller may collect his or her interested information on one page regardless of the type of application including the information of interest to provide them to the user. Here, the information of interest may be information for which a period of time displayed on the touch screen is above a predetermined period of time.

Figure 7D:
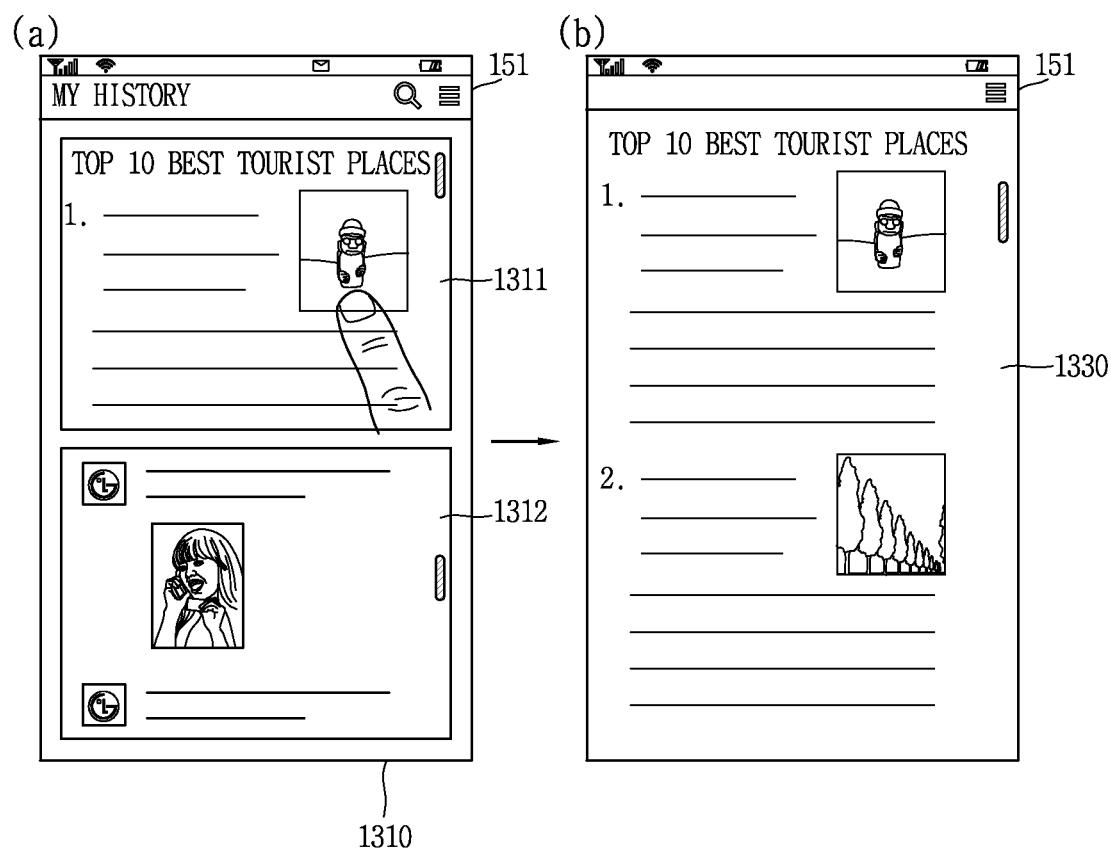

For example, as illustrated in FIG. 7D(a), a separate page 1310 may include at least one information of interest 1311, 1312. When any one of the information of interest is selected, the controller 180 may display an electronic document or an execution screen 1310 of an application including the selected information of interest. When the relevant application is not carried out, the controller 180 may activate the relevant application, and then display the information of a portion including the relevant information of interest.

On the other hand, such a separate page may be any one of home screen pages or a page provided through a specific application.

Figure 8A:
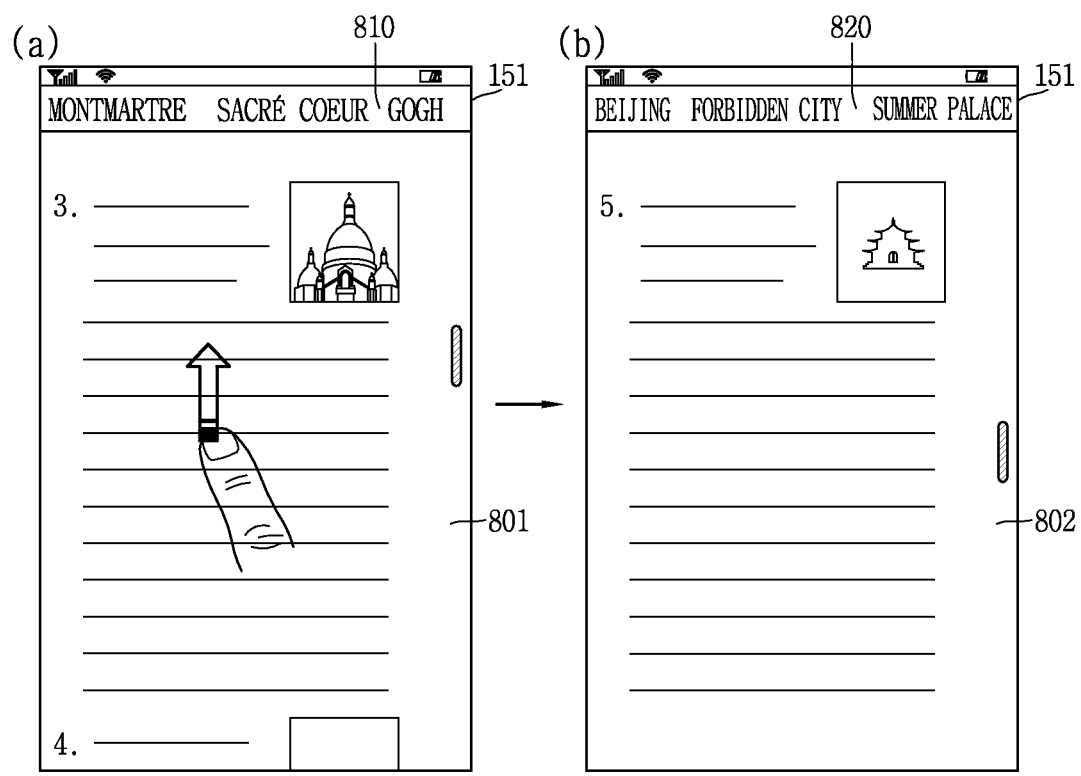
FIGS. 8A, 8B and 8C are conceptual views for explaining a method of providing keyword information in a mobile terminal according to the present disclosure.
Figure 8B:
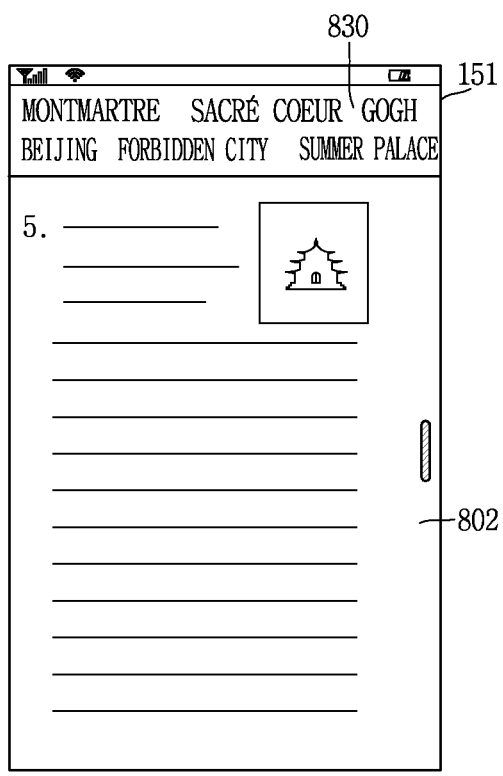
Figure 8C:
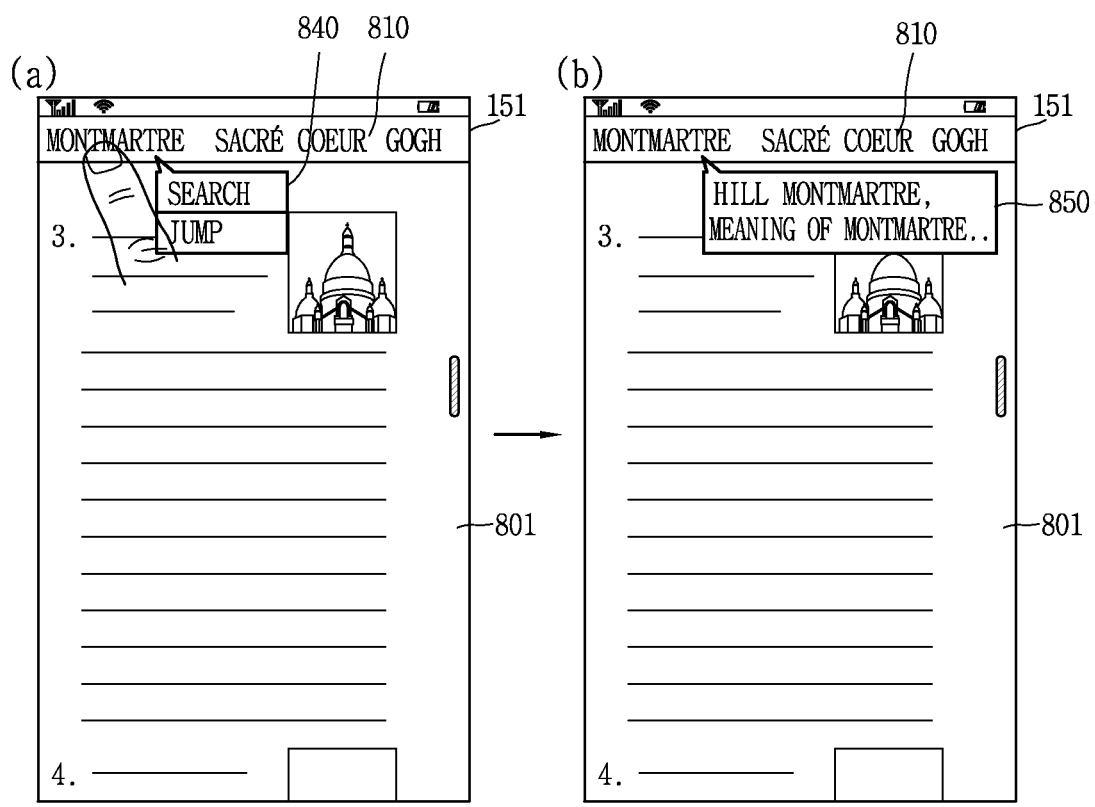

Hereinafter, a method of providing keyword information to a user will be described in more detail with reference to the accompanying drawings. FIGS. 8A, 8B and 8C are conceptual views for explaining a method of providing keyword information in a mobile terminal according to the present disclosure. A mobile terminal according to the present disclosure may provide a function described below in response to the foregoing touch satisfying a predetermined condition. Meanwhile, the present disclosure may not be necessarily limited to this, and may perform a function described below even when a specific mode is not activated.

A mobile terminal according to the present disclosure may extract keywords from currently displayed screen information. The extracted keywords 810 (for example, Montmartre, Sacré Coeur, Gogh) may be provided in one region as illustrated in FIG. 8A(a). The controller 180 may extract words satisfying a predetermined condition as a keyword from the displayed screen information 801. For example, a word satisfying a predetermined condition may be a word used above a predetermined frequency, a subject of a sentence, or the like. Moreover, the controller 180 changes at least part of currently displayed screen information 801 to another screen information 802 based on a touch linked to a scroll function as illustrated in FIGS. 8A(a) and 8A(b). Furthermore, the controller 180 may extract a keyword contained in the changed screen information 802 to display the extracted keyword 820 in one region of the touch screen 151.

In this manner, a keyword displayed on the touch screen may be switched whenever the display range is changed. In other words, the controller 180 may extract a keyword based on screen information currently displayed on the touch screen 151, and also change the displayed keyword when the screen information is changed.

On the contrary, the controller 180 may display a keyword that has been displayed prior to changing a display range along with a keyword included in currently displayed screen information even when the display range is changed as illustrated in FIG. 8B (refer to reference numeral 830 in FIG. 8B). As illustrated in the drawing, the controller 180 accumulate keywords that have been displayed first even when the display range is changed to display a newly extracted keyword. Through this, the user may recognize which content is included in the screen information that have been displayed in the past.

On the other hand, in a mobile terminal according to the present disclosure, when any one of the displayed keywords is selected (for example, Montmartre) as illustrated in FIG. 8C(a), the controller 180 may display a list 840 for selecting an executable function in connection with the selected keyword or a function icon corresponding to at least one executable function in connection with the selected keyword. Furthermore, when there is one connected function, the controller may immediately execute the connected function in response to the selection of a keyword.

When any one item (or function) is selected from the list as illustrated in the drawing, the controller 180 may process a function corresponding to the selected item using the selected keyword. For example, when a "search" function is selected, the controller may perform a search on the selected keyword through a search engine or an application associated with a search function. As illustrated in FIG. 8C(b), a search result may be displayed through a popup window 850. Furthermore, though not shown in the drawing, the search result may be provided through an application used for search. For another example, when a "jump" function is selected, the controller 180 may display the screen information of a portion including the relevant keyword.

Furthermore, though not shown in the drawing, indicators may be displayed at a portion corresponding to a place at which the screen information of a portion including the relevant keyword is located in the scroll region (refer to reference numeral 703 in FIG. 7A).

Figure 9A:
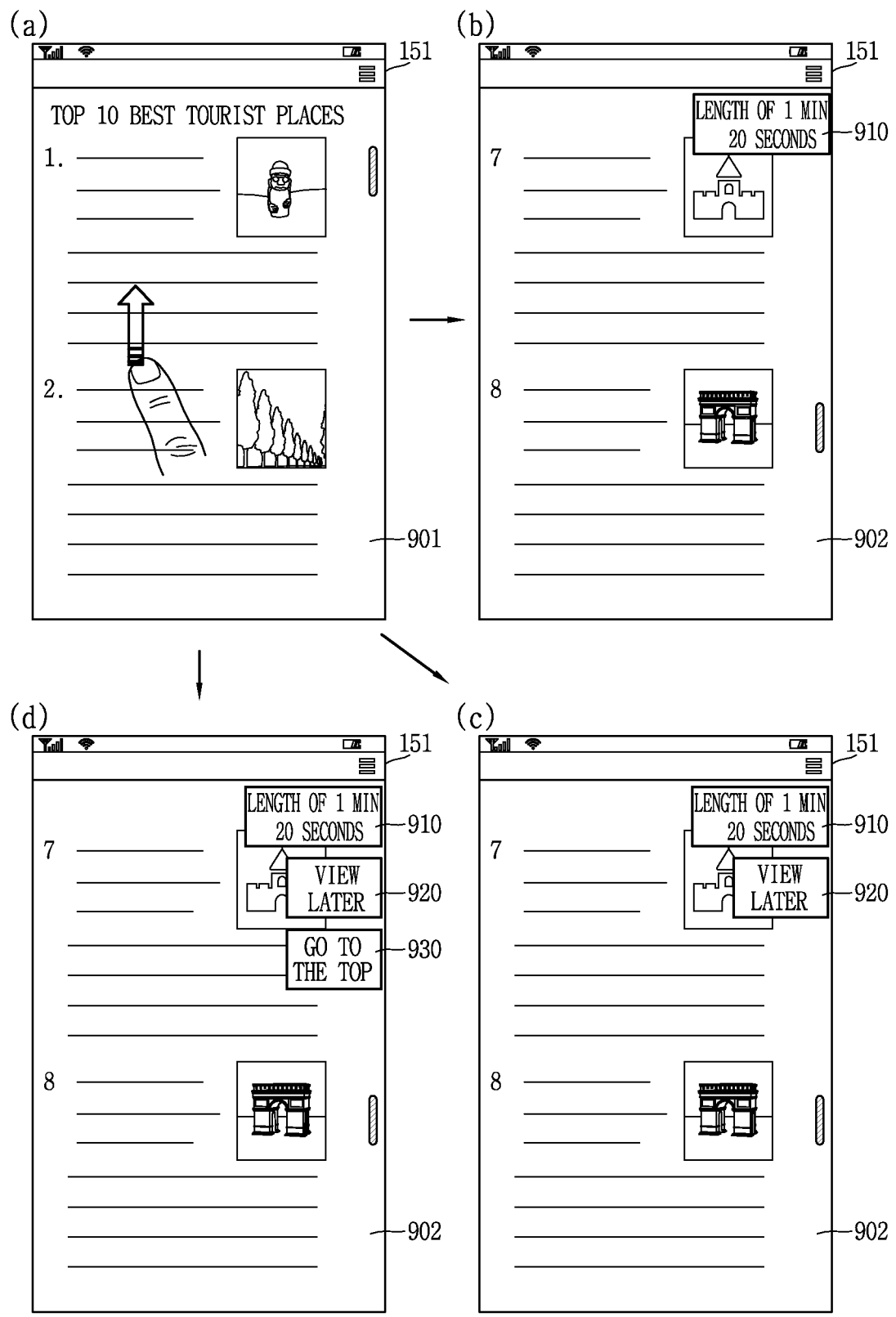
FIGS. 9A and 9B are conceptual views for explaining an additional function on which a user's intention corresponding to a scrolling touch input is reflected in a mobile terminal according to the present disclosure.
Figure 9B:
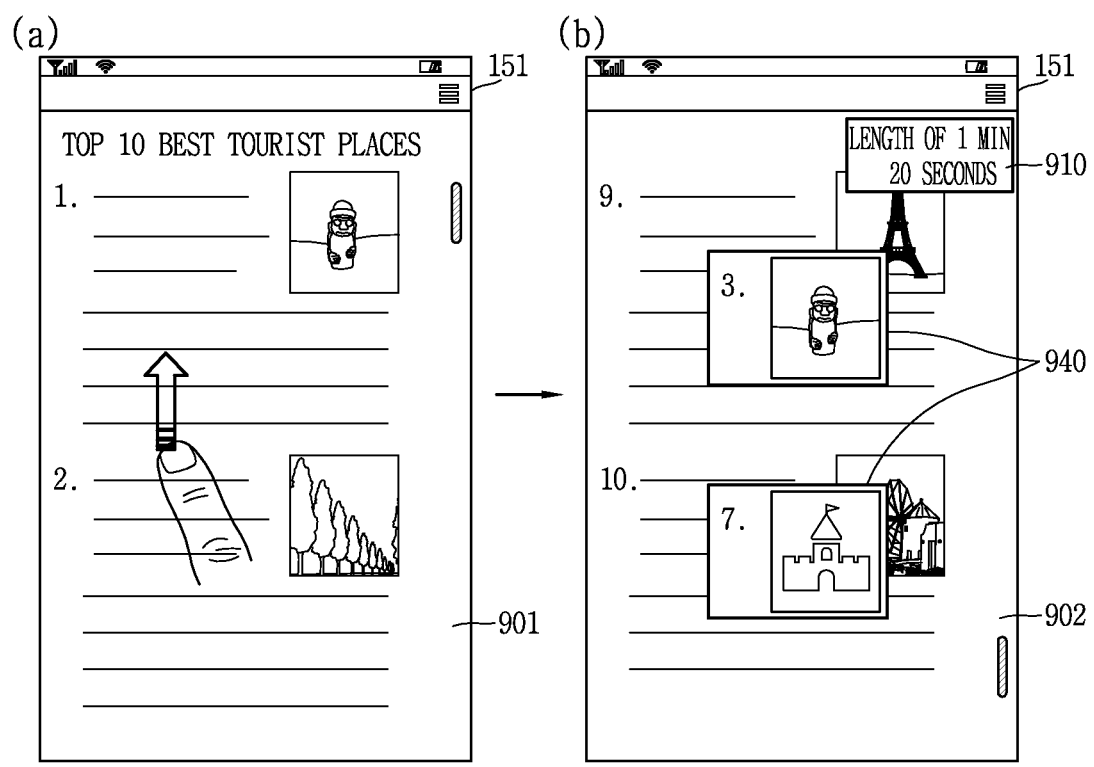

Hereinafter, a method of performing a specific function based on a scroll speed will be described in more detail with reference to the accompanying drawings. FIGS. 9A and 9B are conceptual views for explaining an additional function on which a user's intention corresponding to a scrolling touch input is reflected in a mobile terminal according to the present disclosure.

A user often wants to know which amount of the relevant document is read when reading a certain electronic document such as a news article or the like. In other words, the user likely wants to know a time consumed to read an electronic document to be read. In this case, when an electronic document is displayed, the user scrolls the relevant document at a fast speed to show a pattern of checking the total amount. As a result, in order to reflect the user's intention, when a touch linked to a scroll function is applied at a speed above a predetermined speed subsequent to displaying an electronic document, the present disclosure may provide information on a time consumed to read the relevant electronic document.

At this time, when a scroll operation up to the last portion of the electronic document or the corresponding portion is carried out through a scroll operation at a speed above the predetermined speed, the controller may also display information on the consumed time.

Information on such a time may be based on time information prestored in the controller 180. Furthermore, the controller 180 may monitor information on a time from the start of the display of an arbitrary electronic document to the end of the display on the terminal and an amount of the relevant electronic document to learn information for a terminal user.

Furthermore, through the learning, the controller may provide information on an estimated time consumed to read a newly displayed electronic document to the user.

For example, when a drag touch, a slide touch or a flick touch at a speed above a predetermined speed is applied in a state that a specific electronic document 901 is displayed as illustrated in FIG. 9A(a), the controller 180 displays estimated time information 910 used to read the relevant electronic document as illustrated in FIG. 9A(b). At this time, the controller 180 may provide a function icon 920 allowing the user to use the relevant electronic document later as illustrated in FIG. 9A(c). For example, a "view later" icon is selected, the controller 180 may provide the relevant electronic document to the user again later. For example, when the user executes an application associated with the relevant electronic document, the controller 180 may preferentially display the electronic document over the other information. For another example, the controller 180 may provide a URL address corresponding to the relevant electronic document in a message format to the user. For still another example, when an application associated with the electronic document is executed to display a list containing electronic document items corresponding to different contents on the application (for example, when the relevant electronic document is a new article, and a news list is displayed), the controller 180 may display an item corresponding to an electronic document for which the view later function is selected in a highlighted manner on the list.

Furthermore, when the "view later" function is selected, the controller 180 may end the display of the relevant electronic document.

On the other hand, as illustrated in FIG. 9A(b), the controller 180 may display a "go to the top" function icon 930 to cope with a case where an electronic document is scrolled down to a bottom end thereof to check an amount of the electronic document. In this case, when the upward function icon 930 is selected, the controller 180 may display the foremost portion of the electronic document on the touch screen.

On the other hand, as illustrated in FIGS. 9B(a) and 9B(b), when a touch linked to a scroll function having a speed above a predetermined speed is applied, the controller 180 may provide at least part of information included in the relevant electronic document to the user through a popup window. In other words, the controller 180 may provide information satisfying a predetermined criteria among information included in the relevant electronic document through a popup window or the like in consideration of a problem in which the user cannot sufficiently use information included in the relevant electronic document due to a fast scroll to the electronic document. Here, information satisfying a predetermined criteria may be information satisfying at least one of various criteria such as summary information, keyword information, user's information of interest, and the like on information included in the relevant content. At this time, as illustrated in FIG. 9B(b), the controller 180 may additionally display time information 910 consumed for a user to read the relevant electronic document in response to a touch linked to a scroll function having a speed above the predetermined speed.

Hereinafter, a scroll function according to the present disclosure will be described in more detail through a specific embodiment. FIGS. 10A, 10B, 10C, 10D, 10E, 11A and 11B are conceptual views for explaining a scroll function according to the present disclosure, for example, on email information. FIGS. 12A and 12B are conceptual views for explaining a scroll function according to the present disclosure, for example, on an SNS application.

On the other hand, various functions associated with the foregoing scroll may be used to display various visual information displayed on the terminal. For such an example, examples in which the foregoing various functions are applied on a list containing a plurality of items such as an email list will be described The controller 180 may provide a function described below in response to a touch satisfying the foregoing predetermined condition. According to the present disclosure, when a touch satisfying the predetermined condition is applied, it may be expressed as that a specific mode is activated. The specific mode being activated may be recognized by the user through the display of the notification image 310 when a touch satisfying a predetermined condition is applied as illustrated in FIGS. 10A(a) and 10A(b). Meanwhile, the present disclosure may not be necessarily limited to this, and a function described below may be carried out even when a specific mode is not activated.

There may exist at least one user's memorable item on a list containing a plurality of items such as an email. In this case, when a portion that does not contain at least one memorable item is displayed on the current touch screen, the user should perform a burdensome process for scrolling the list again to find a memorable item.

Accordingly, in order to resolve the inconvenience, the present disclosure may display an indicator 1010 (refer to FIG. 10A(b)) at a position containing a user's memorable portion on a scroll bar region 1003, thereby allowing the user to immediately use a portion containing the relevant item. For example, when a predetermined type of touch (for example, long touch) is applied to an indicator region 1003 in a state that part of a list containing an arbitrary item is displayed, the controller 180 displays an indicator 1010. Furthermore, when the indicator 1010 is selected again even when a portion of the list containing an arbitrary item is switched to another portion, the controller 180 may redisplay the portion of the list containing an arbitrary item. Through this, the user may switch the screen to his or her desired portion at a fast speed. Here, the indicator 1010 may be displayed in a region on which an indicator 1005 indicating the display position of a currently displayed electronic document is displayed.

On the other hand, the indicator 1010 may be deleted based on the user's request. For example, when another type of touch (for example, drag touch) is applied to the indicator 1010, the controller 180 may no longer display the indicator 1010.

For another example, a mobile terminal according to the present disclosure may process information for which a period of time displayed on the touch screen is above a predetermined period of time among screen information displayed on the touch screen as the user's information of interest. In other words, the controller 180 may determine a portion of a list that has been displayed for more than a predetermined period of time on the touch screen as information that has been viewed for a long period of time by the user, and store it as the user's information of information.

For example, the controller 180 may count a display maintaining time of a portion displayed on the touch screen among information included in a list, and generate log information (or log) on a portion for which the display maintaining time satisfies a predetermined criteria from the portion of the list that has been displayed on the touch screen. Here, log information may include at least one of coordinate information on which a portion satisfying the predetermined criteria is located at which portion of the relevant list and information on a display maintaining time of the portion satisfying the predetermined criteria.

Figure 10B:
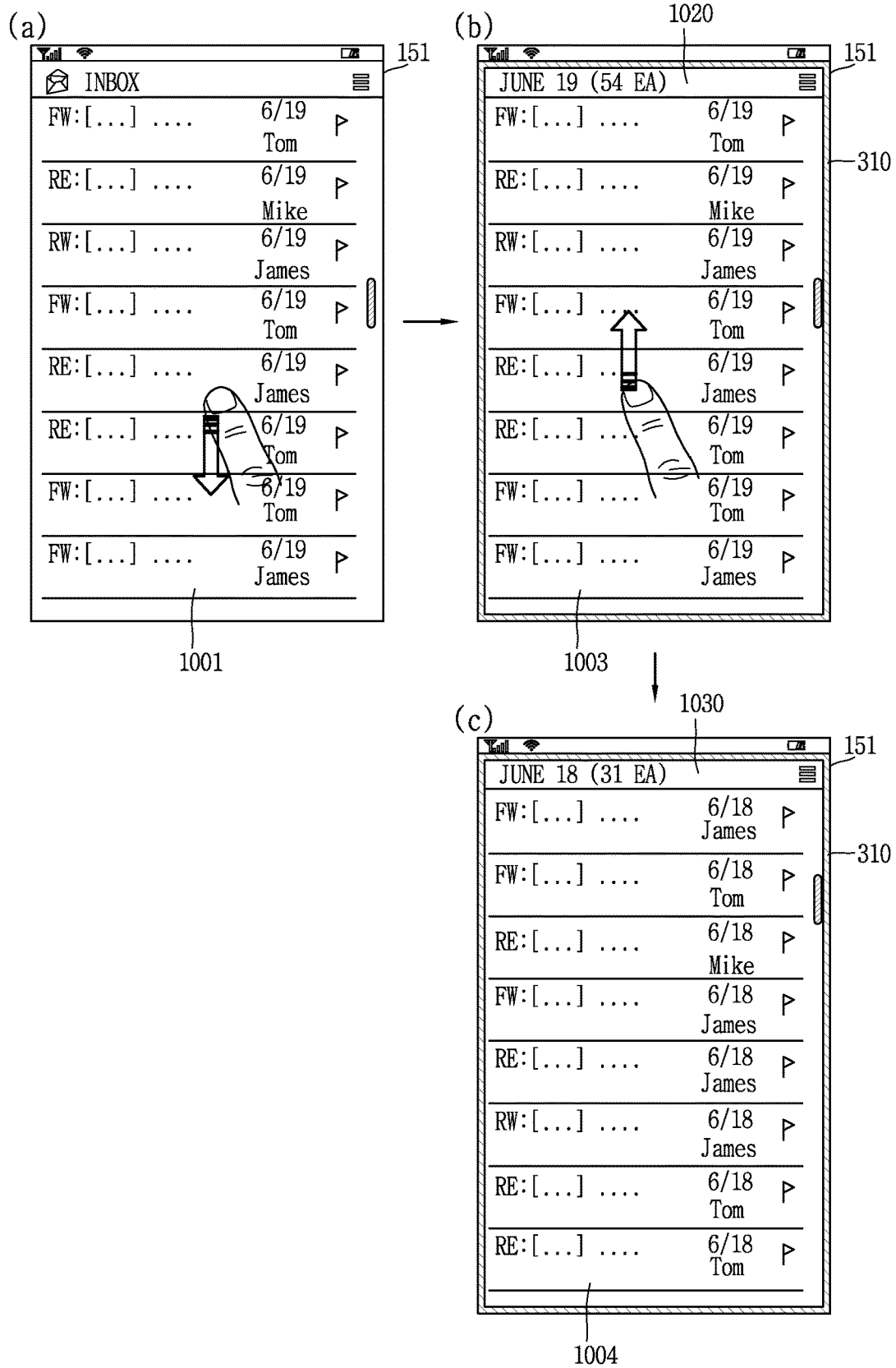

For another example, a mobile terminal according to the present disclosure may activate a specific mode as illustrated in FIGS. 10B(a) and 10B(b) in response to the application of a touch satisfying a predetermined criteria, and provide at least one of information filtered based on a keyword contained in a list or a specific criteria, in this specific mode.

For example, as illustrated in FIG. 10B(b), the controller 180 may display information in connection with information on a portion 1003 of a currently displayed list. For example, the controller 180 may display information 1020 on how many emails have been received on a date on which an email corresponding to an item contained in a currently displayed list is received, in one region of the touch screen, as illustrated in the drawing. At this time, the controller 180 may not be necessarily limited to a currently displayed range, and also may provide information on at least another portion of the list in connection with the currently displayed range. For example, when a currently displayed portion is a mail received on June 19, the controller 180 may provide information associated with the currently displayed portion even in consideration of the information of a mail received on June 19 contained in a not-yet-displayed portion in one region.

Furthermore, as illustrated in FIG. 10B(c), when a display range is changed to display another portion 1004 of the list, the controller 180 may display information 1030 on how many emails are received on a date on which the emails corresponding to items contained in the changed portion 1004 are received in one region of the touch screen as illustrated in the drawing. In this manner, the controller 180 may display information associated with a currently displayed portion in one region of the touch screen 151.

Figure 10C:
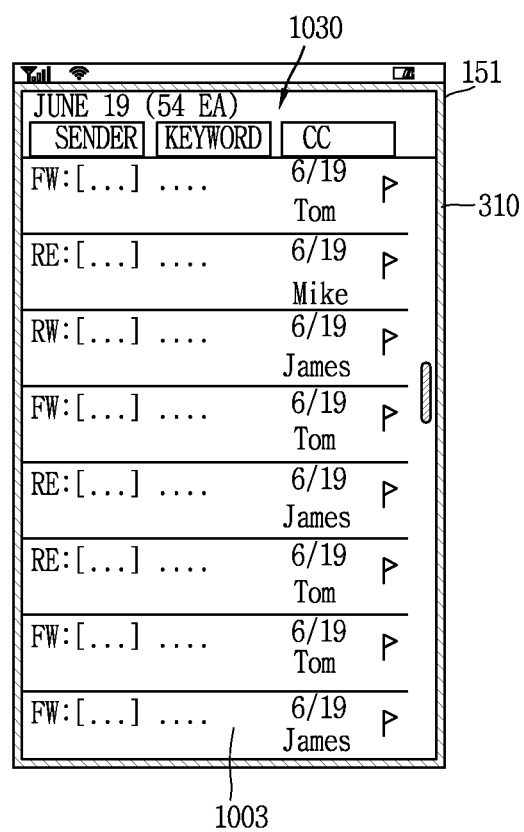

On the other hand, as illustrated in FIG. 10C, the controller 180 may allow a user to select which type of associated information is to be provided. The controller 180 may display information on at least one category (for example, date received, sender, keyword, carbon copy) in one region 1030 as illustrated in the drawing, and when any one of those categories is selected, the controller 180 may provide information on the selected category in the one region 1030.

Figure 10D:
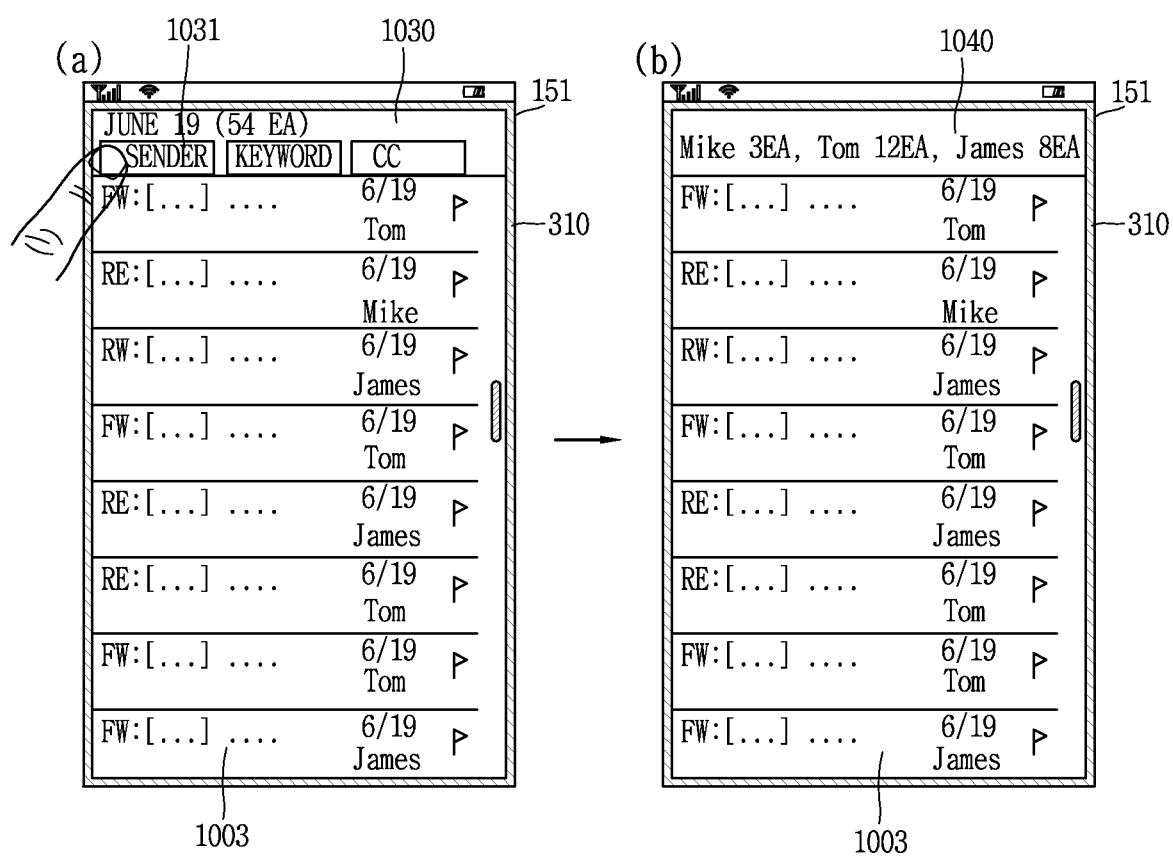

For example, when a category corresponding to the "sender" is selected as illustrated in FIG. 10D(a), the controller 180 may provide information on how many mails have been received based on the sender on the list as illustrated in FIG. 10D(b).

At this time, the controller 180 may search information corresponding to the selected category at a portion in connection with a currently displayed email item (for example, an item corresponding to the same date received as a date on which the currently displayed email item is received.)

Furthermore, the controller 180 may search information corresponding to the selected category on the entire list.

Figure 10E:
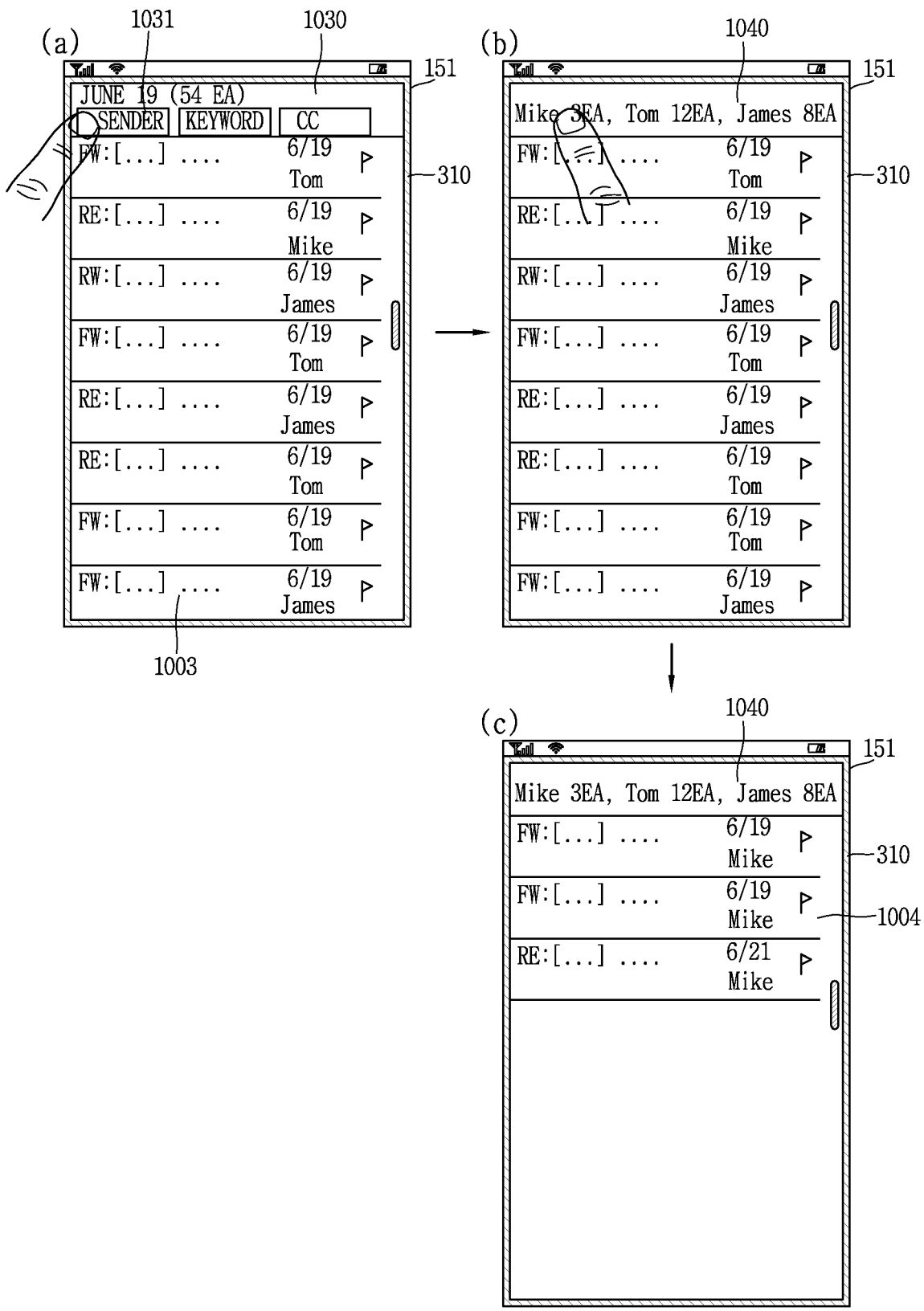

On the other hand, as illustrated in FIGS. 10E(a) and 10E(b), the controller 180 may provide more specific information based on a user's additional request in a state that information corresponding to any one category (or criteria) among information included in a list is displayed in one region 1040. For example, in a state that information corresponding to any one category (for example, sender) is displayed, when an additional request for the information is received, the controller 180 may filter an email list based on the information to provide the filtered information. For example, when a specific sender (for example, Mike) is selected in a state that a number of emails received based on the sender are displayed, the controller 180 may filter mails sent by Mike from the list to provide the filtering result. Accordingly, the user may more intuitively filter his or her desired information.

Figure 11A:
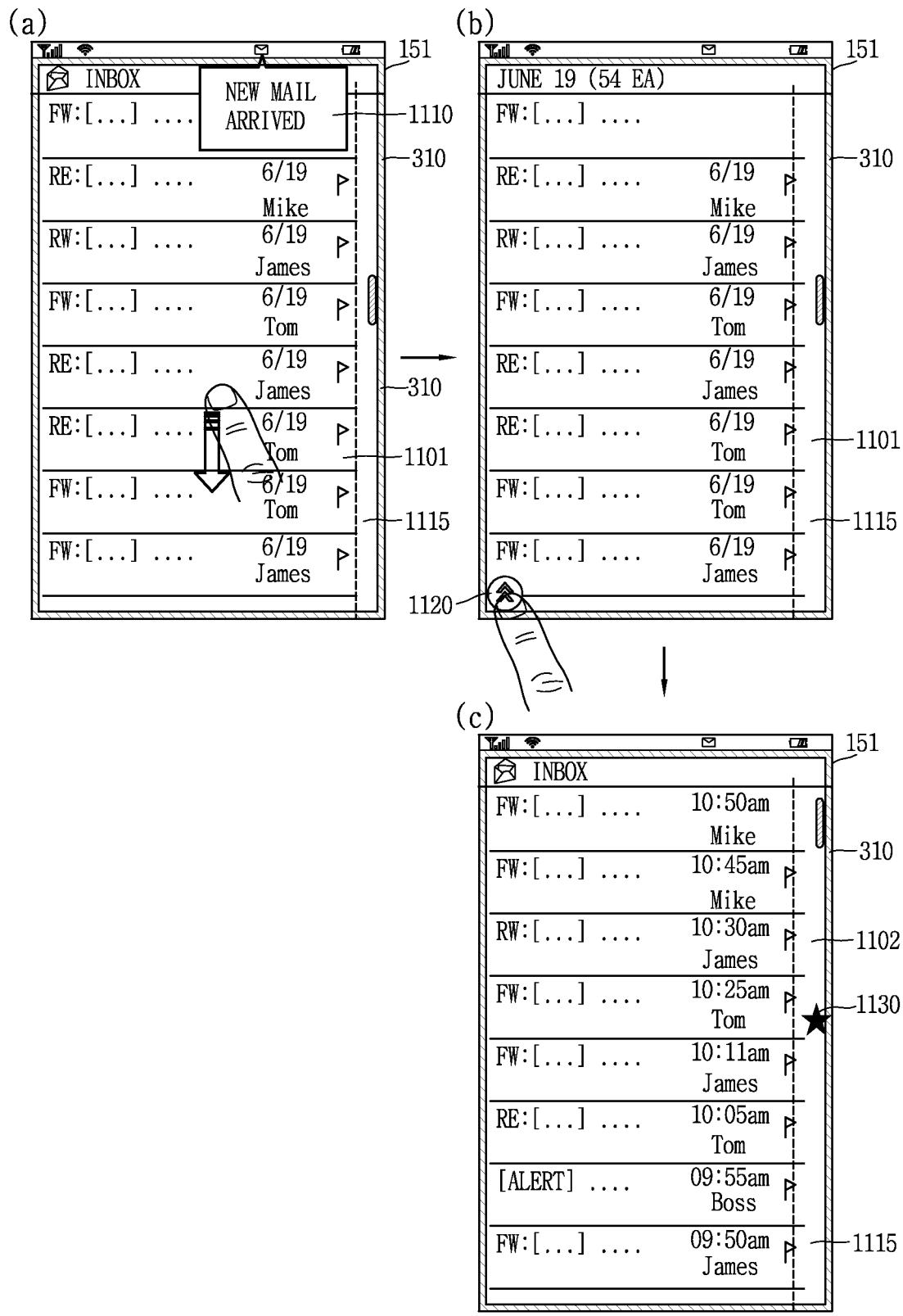
Figure 11B:
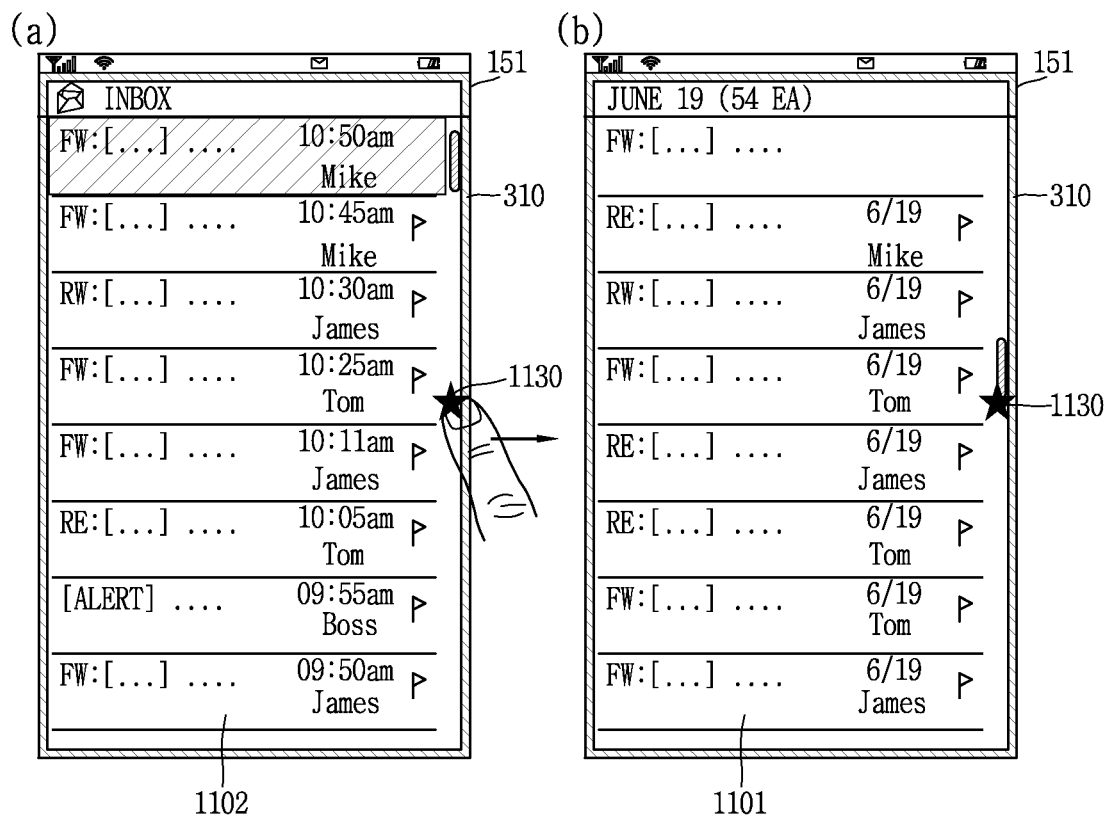
Figure 12A:
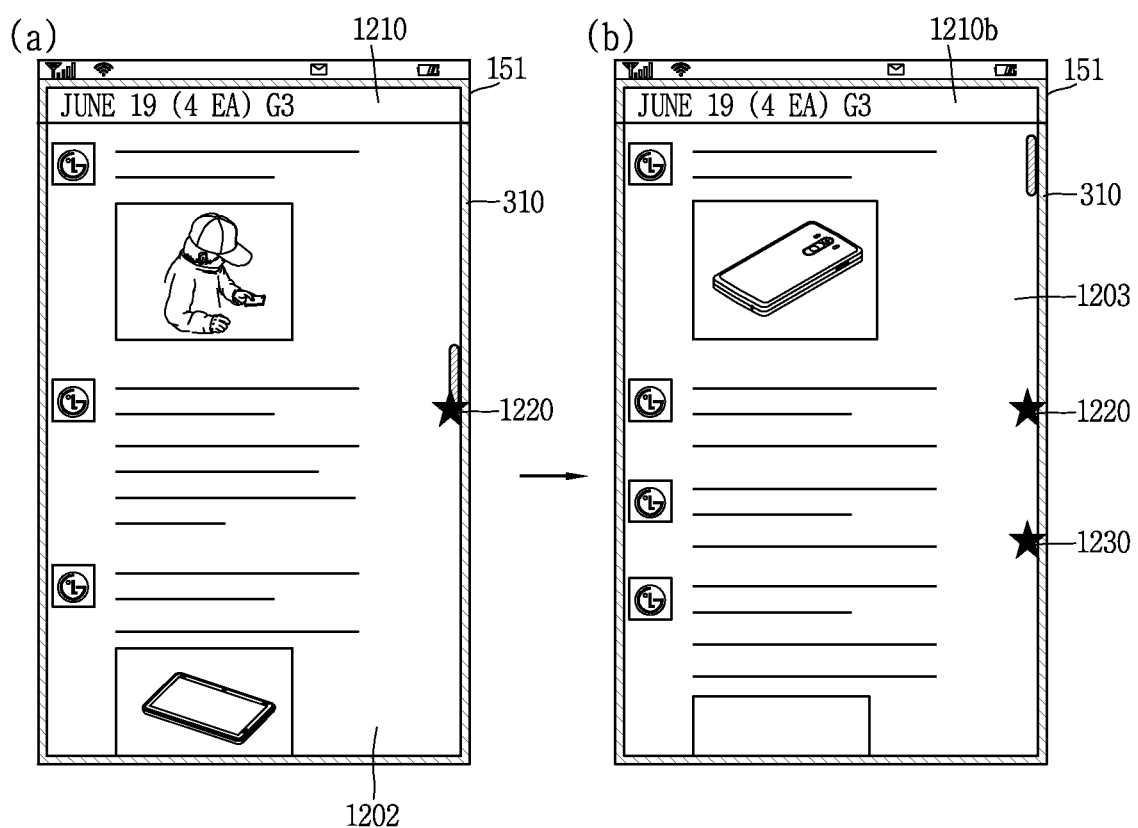
FIGS. 12A and 12B are conceptual views for explaining a scroll function according to the present disclosure, for example, on an SNS application.
Figure 12B:
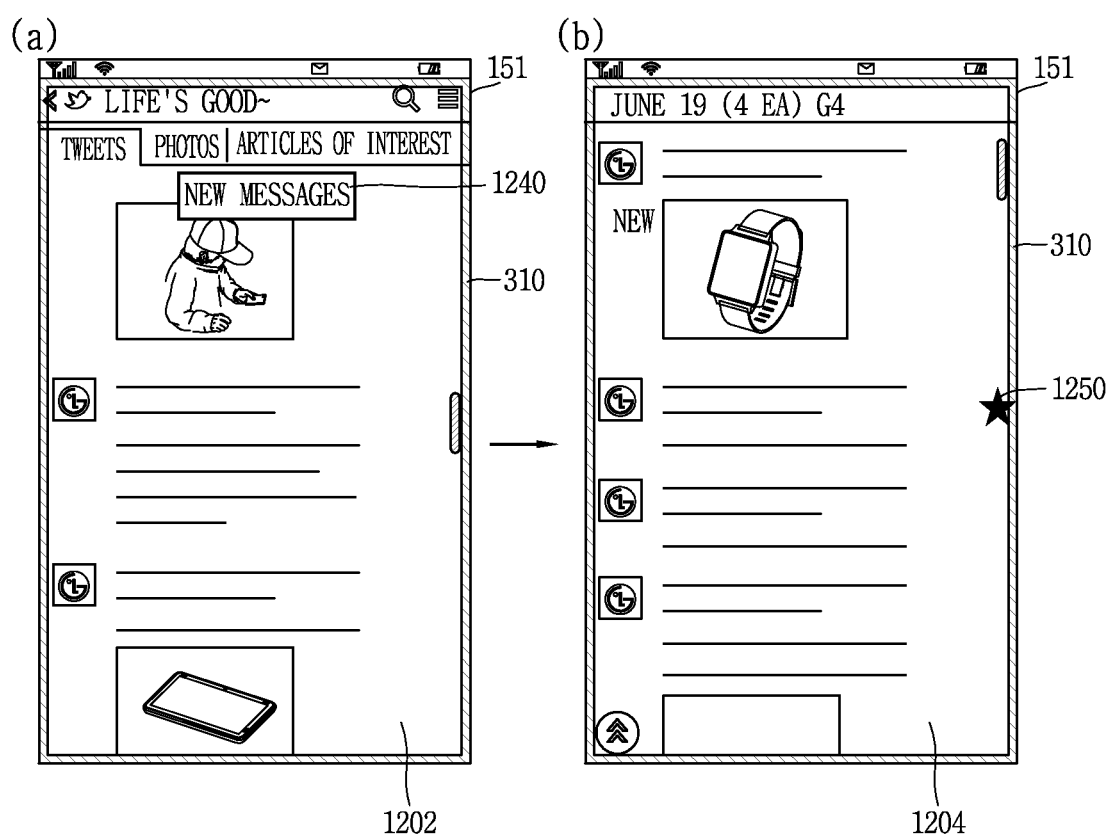

On the other hand, as illustrated in FIG. 11A(a), when a new email is received in a state that any one portion 1101 of the list is displayed, an notification image 1110 for notifying this may be displayed. The notification image 1110 may be displayed for a predetermined period of time and then disappear. Moreover, when a touch to the notification image 1110 is applied, the controller 180 may move the list to the top end to display the newly received email as illustrated in FIG. 11A(c). In this case, the controller 180 may display an indicator 1130 at a position corresponding to a portion that has been displayed on the touch screen prior to applying a touch to the notification image 1110 on a scroll bar region 1115. Accordingly, in order to display the newly received email, even when the list is moved to the top end, the controller 180 may redisplay a portion that has been used by the user prior to receiving the new email based on the selection of the indicator 1130. The controller 180 may redisplay a portion 1101 that has been used by the user prior to receiving the new email as illustrated in FIG. 11B(b) based on the selection of the indicator 1130 as illustrated in FIG. 11B(a).

For another example, when a new email is received, the controller 180 may display a graphic object 1120 for moving a currently displayed portion to the top end of a list containing the new email as illustrated in FIG. 11A(b). Moreover, when a touch to the notification image 1110 is applied, the controller 180 may display the list to the top end to display the newly received email as illustrated in FIG. 11A(c). In this case, the controller 180 may display an indicator 1130 at a position corresponding to a portion that has been displayed on the touch screen prior to applying a touch to the notification image 1110 on the scroll bar region 1115 as illustrated in FIG. 11A(c). Accordingly, in order to display a newly received email, even when a list is moved to the top end (1102), the controller 180 may redisplay a portion 1101 that has been used by the user prior to receiving the new email as illustrated in FIG. 11B(b) based on the selection of the indicator 1130 as illustrated in FIG. 11B(a).

On the other hand, the controller 180 may display a graphic object 1120 for moving an email list to the top end as illustrated in FIG. 11A(b) when the email list is not moved to the top end through the selection of the notification image 1110 for notifying that the new email is received as illustrated in FIG. 11A(a). In this case, the controller 180 may display the notification image 1110 as illustrated in FIG. 11A(a) for a predetermined period of time, and display the graphic object 1120 as illustrated in FIG. 11A(b) when the predetermined period of time has passed. Accordingly, the user may move an email list to the top end anytime to check a new mail.

On the other hand, such an example may be also applicable to an social network service (SNS) page (such a page is available on an SNS related application or available on a webpage) in a similar manner.

As illustrated in FIGS. 12A(a) and 12A(b), the controller 180 may display information (refer to reference numerals 1210, 1210b, for example, keyword information, a number of posts on a specific date, information on those who entered comments, etc.) associated with a currently displayed portion.

Furthermore, the controller 180 may display an indicator 1220, 1230 indicating a position including a long displayed portion or user's selected portion as illustrated in the drawing. When the indicator is selected, the controller may redisplay a portion matching the selected indicator.

Moreover, as illustrated in FIG. 12B(a), when a new message (or post) is received, the controller 180 displays a notification image 1240. Furthermore, the controller 180 changes a screen range to a position including the new message (or post) based on the selection of the notification image 1240. At this time, the controller 180 may display an indicator 1250 at a position corresponding to a portion that has been displayed on the touch screen prior to applying a touch to the notification image 1240 on the scroll bar region 1115. Accordingly, even when a display range is changed to display a new post (1104), the controller 180 may redisplay a portion that has been used by the user prior to receiving the new post based on the selection of the indicator 1250.

On the other hand, the foregoing embodiment described in the above email list may be applicable to a specific embodiment for a case where a new post is uploaded to change a screen display range in a similar manner.

As described above, according to the present disclosure, a control command for scrolling screen information and a control command for executing an additional function associated with screen information may be concurrently defined for a touch input for scrolling screen information. Accordingly, even when a user does not enter an additional menu screen to execute an additional function, the present disclosure may perform an additional function associated with currently displayed screen information only by entering a gesture for scrolling the currently displayed screen information. Accordingly, the user may access the execution of an additional function in a more convenient and intuitive manner.

Moreover, the present disclosure may analyze a user's interested portion on a specific electronic document, and allow the user to recognize the interested portion through a visual image when information on the relevant portion is redisplayed later. Accordingly, the user may more easily access the relevant portion when he or she wants to use the interested portion again.

The foregoing present invention may be implemented as codes readable by a computer on a medium written by the program. The computer-readable media may include all kinds of recording devices in which data readable by a computer system is stored. Examples of the computer-readable media may include hard disk drive (HDD), solid state disk (SSD), ROM, RAM, CD-ROM, magnetic tape, floppy disk, and optical data storage device, and the like, and also include a device implemented in the form of a carrier wave (for example, transmission via the Internet). In addition, the computer may include the controller 180 of the terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A mobile terminal, comprising:
a memory for storing matching information on a touch speed and a function matched with the touch speed;
a touchscreen; and
a controller configured to:
cause the touchscreen to display a portion of a webpage;
scroll the webpage in a first direction based on a first touch received at the touch screen in a first touch direction;
receive, via the touch screen, a second touch in a second touch direction opposite to the first touch direction;
scroll the webpage in the second touch direction if the second touch was not received within a predetermined period of time after the first touch;
monitor speed of the second touch in the second touch direction if the second touch was received within the predetermined period of time after the first touch;
scroll the webpage in the second touch direction and perform a first predetermined function related to the webpage that matches the speed of the second touch, when the speed of the second touch is below a predetermined speed and when the second touch is received within the predetermined period of time;
perform a second predetermined function related to the webpage that matches the speed of the second touch, and not scroll the webpage while continuing to display a portion of the webpage that was displayed prior to the receiving of the second touch, when the speed of the second touch is above the predetermined speed and when the second touch is received within the predetermined period of time after the receiving of the first touch,
wherein the first and second predetermined functions cause the touchscreen to display icons associated with the predetermined functions while continuing the display of the portion of the webpage that was displayed prior to the receiving of the second touch.

2. The mobile terminal of claim 1, wherein each of the icons are for any one of a backward function, a search function, or a capture function.

3. The mobile terminal of claim 1, wherein one of the predetermined functions includes copying a uniform resource locator (URL) address of the webpage.

4. The mobile terminal of claim 1, wherein the controller is further configured to:
count time during which the webpage is displayed on the touch screen; and
generate log information for the webpage when the count time satisfies a defined criteria.

5. The mobile terminal of claim 4, wherein the count time is performed when the second touch is received at a speed in the second direction that exceeds a threshold value.

6. The mobile terminal of claim 4, wherein the controller is further configured to:
cause the touchscreen to display a scroll bar for scrolling the webpage, wherein the scroll bar includes:
a first indicator indicating a position within the webpage that is currently displayed, and
a second indicator indicating a position within the webpage that is associated with the generated log information.

7. The mobile terminal of claim 6, wherein the controller is further configured to:
switch a currently displayed portion of the webpage on the touch screen to a portion of the webpage from which the log information is generated in response to selection of the second indicator.

8. The mobile terminal of claim 1, wherein the controller is further configured to:
cause the touchscreen to display a scroll bar for scrolling the webpage, wherein the scroll bar includes:
a first indicator indicating a position within the webpage that is currently displayed, and
a second indicator indicating a position within the webpage that has been displayed when a touch satisfying a predetermined condition has been applied.

9. A mobile terminal, comprising:
a memory for storing matching information on a touch speed and a function matched with the touch speed;
a touchscreen; and
a controller configured to:
cause the touchscreen to display a portion of a webpage;
scroll the webpage in a first direction based on a first touch received at the touch screen in a first touch direction;
receive, via the touch screen, a second touch in a second touch direction opposite to the first touch direction;
monitor speed of the second touch in the second touch direction if the second touch was received within the predetermined period of time after the first touch;
scroll the webpage in the second touch direction and perform a first predetermined function related to the webpage that matches the speed of the second touch, when the speed of the second touch is above a predetermined speed and when the second touch is received within the predetermined period of time; and
scroll the webpage in the second touch direction and perform a second predetermined function related to the webpage that matches the speed of the second touch, when the speed of the second touch is below the predetermined speed and when the second touch is received within the predetermined period of time after the receiving of the first touch,
wherein the first predetermined function is different from the second predetermined function, and
wherein the second predetermined function includes displaying an icon.

10. The mobile terminal of claim 9, wherein the first predetermined function includes copying a uniform resource locator (URL) address of the webpage.

11. The mobile terminal of claim 9, wherein the icon is for any one of a backward function, a search function, or a capture function.

12. A mobile terminal, comprising:
a memory for storing matching information on a touch speed and a function matched with the touch speed;
a touchscreen; and
a controller configured to:
cause the touchscreen to display a portion of a webpage;
scroll the webpage in a first direction based on a first touch received at the touch screen in a first touch direction;
receive, via the touch screen, a second touch in a second touch direction opposite to the first touch direction;
scroll the webpage in the second touch direction if the second touch was not received within a predetermined period of time after the first touch;
monitor speed of the second touch in the second touch direction if the second touch was received within the predetermined period of time after the first touch;
perform a predetermined function related to the webpage that matches the speed of the second touch, and not scroll the webpage while continuing to display a portion of the webpage that was displayed prior to the receiving of the second touch, when the second touch is received within the predetermined period of time and when the speed of the second touch is below a predetermined speed; and
cause the touchscreen to display an icon associated with the predetermined function while continuing the display of the portion of the webpage that was displayed prior to the receiving of the second touch, when the second touch is received within the predetermined period of time after the first touch and when the speed of the second touch is above the predetermined speed.

* * * * *